(12) United States Patent
Azuma et al.

(10) Patent No.: US 11,414,035 B2
(45) Date of Patent: Aug. 16, 2022

(54) WORK VEHICLE

(71) Applicant: KUBOTA CORPORATION, Osaka (JP)

(72) Inventors: Masanori Azuma, Sakai (JP);
Terumasa Kobayashi, Sakai (JP);
Hiroki Nagai, Sakai (JP); Tomohisa Yamamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/282,784

(22) PCT Filed: Jun. 6, 2019

(86) PCT No.: PCT/JP2019/022594
§ 371 (c)(1),
(2) Date: Apr. 5, 2021

(87) PCT Pub. No.: WO2020/075341
PCT Pub. Date: Apr. 16, 2020

(65) Prior Publication Data
US 2021/0387587 A1      Dec. 16, 2021

(30) Foreign Application Priority Data

Oct. 12, 2018  (JP) .............................. JP2018-193194
Nov. 13, 2018  (JP) .............................. JP2018-213064

(51) Int. Cl.
*B60R 21/13*  (2006.01)
*B62D 33/06*  (2006.01)
*B60R 21/00*  (2006.01)

(52) U.S. Cl.
CPC ........ *B60R 21/131* (2013.01); *B62D 33/0625* (2013.01); *B60R 2021/0018* (2013.01); *B60R 2021/0076* (2013.01)

(58) Field of Classification Search
CPC .................. B60R 21/131; B60R 21/13; B60R 2021/0018; B60R 2021/0076; B62D 33/0625; B62D 49/06
See application file for complete search history.

(56) References Cited

U.S. PATENT DOCUMENTS 5,042,835 A * 8/1991 Burns ................... B60R 21/131
280/756
5,779,272 A   7/1998 Panek et al.
(Continued)

FOREIGN PATENT DOCUMENTS

CA     2347964 A1 *  4/2002   ........... B60R 21/131
DE     4415246 A1 *  6/1995   ........... B60R 21/131
(Continued)

OTHER PUBLICATIONS

Bender Matthias, 'Machine Translation of EP 2786884 A2 Obtained Feb. 2, 2022', Mar. 12, 2014, Entire Document. (Year: 2014).*
(Continued)

*Primary Examiner* — Jonathan Ng
*Assistant Examiner* — Scott F. Underwood
(74) *Attorney, Agent, or Firm* — Keating and Bennett, LLP

(57) ABSTRACT

A tractor includes a protective frame including a lower frame and an upper frame rotatably coupled with an upper portion of the lower frame, and an assist mechanism to assists a rotation of the upper frame.

12 Claims, 23 Drawing Sheets

(56) References Cited

U.S. PATENT DOCUMENTS

| | | | | |
|---|---|---|---|---|
| 8,528,924 | B1* | 9/2013 | Bartel | B60R 21/13 296/35.2 |
| 8,905,434 | B1* | 12/2014 | Bartel | B60R 21/131 280/756 |
| 9,616,837 | B1* | 4/2017 | Bartel | B60R 21/131 |
| 2007/0252371 | A1* | 11/2007 | Schlup | B60R 21/131 280/756 |
| 2007/0290493 | A1* | 12/2007 | David | B60R 21/13 280/756 |
| 2012/0104802 | A1* | 5/2012 | Reinke | B60R 21/13 296/203.01 |
| 2013/0049338 | A1* | 2/2013 | Alexander, IV | B60R 21/131 280/756 |
| 2016/0009238 | A1* | 1/2016 | Schlup, Jr. | B60R 21/131 280/756 |
| 2016/0236640 | A1* | 8/2016 | Bartel | B60R 21/11 |
| 2017/0129438 | A1* | 5/2017 | Bartel | B60R 21/131 |
| 2018/0037183 | A1 | 2/2018 | Bartel et al. | |
| 2019/0126876 | A1* | 5/2019 | Mayefske | B60R 21/131 |
| 2019/0193661 | A1* | 6/2019 | Minoura | B60R 19/38 |

FOREIGN PATENT DOCUMENTS

| | | |
|---|---|---|
| EP | 0 051 100 A1 | 5/1982 |
| EP | 2 786 884 A2 | 10/2014 |
| EP | 3 248 846 A1 | 11/2017 |
| JP | 2008-081043 A | 4/2008 |
| JP | 2013-014207 A | 1/2013 |
| JP | 2017-210176 A | 11/2017 |

OTHER PUBLICATIONS

Official Communication issued in International Patent Application No. PCT/JP2019/022594, dated Jul. 23, 2019.
Official Communication issued in corresponding European Patent Application No. 19871966.8, dated May 25, 2022.

* cited by examiner

WORK VEHICLE

BACKGROUND OF THE INVENTION

1. Field of the Invention

The present invention relates to a technique for work vehicles such as tractors.

2. Description of the Related Art

Conventionally, a technique of a protective frame provided on a work vehicle such as a tractor has been known. For example, such a technique is described in JP 2008-81043 A.

JP 2008-81043 A describes a configuration in which a roll over protective frame is provided on a rear side of a seat of a traveling vehicle body. The above roll over protective frame has a configuration in which a movable-side frame is rotatably coupled with a fixed-side frame that stands up on the traveling vehicle body side. The above roll over protective frame is configured such that the posture is freely changeable between an upright acting posture in which the movable-side frame stands up with respect to the fixed-side frame and a storing posture in which the movable-side frame is folded downward with respect to the fixed-side frame.

In the roll over protective frame as described in JP 2008-81043 A, in rotating the movable-side frame with respect to the fixed-side frame, it is conceivable that the movable-side frame vigorously rotates to the storing posture side due to its own weight.

In order to prevent the movable-side frame from rotating vigorously as described above, there is a method of strongly fastening a bolt and a nut that couple the fixed-side frame and the movable-side frame rotatably (to be capable of rocking), and increasing the frictional force to make the movable-side frame difficult to rotate.

However, in a case where the bolt and nut are strongly fastened as described above, when an operator changes the roll over protective frame from the upright acting posture to the storing posture, it is necessary to rotate the upper frame against a frictional force caused by strongly fastening the bolt and the nut. Besides, when the operator changes the roll over protective frame from the storing posture to the upright acting posture, it is necessary to rotate the upper frame against the above-described frictional force and a rotational force applied to the upper frame by the weight of the upper frame. Therefore, a further improvement is demanded from the viewpoint of reducing the force needed for a rotating operation of the upper frame.

SUMMARY OF THE INVENTION

Preferred embodiments of the present invention provide work vehicles each capable of reducing the force needed for a rocking operation of a protective frame provided on a rear side of a seat.

The problem to be solved by preferred embodiments of the present invention has been described above, and next, solutions to this problem will be described.

That is, a work vehicle according to a preferred embodiment of the present invention includes a protective frame including a first frame and a second frame rotatably coupled with an upper portion of the first frame; and an assist mechanism that assists a rotating operation of the second frame.

Further, the first frame is a lower frame that is fixed on a rear side of a seat, the second frame is an upper frame coupled with the upper portion of the lower frame through a rocking shaft to be capable of rocking in a front-rear direction, and the upper frame is displaceable by a rocking operation to an upright position in which the upper frame stands up above the lower frame, and to a laid-down position in which the upper frame is folded with respect to the lower frame.

Further, the assist mechanism includes an urging mechanism capable of urging the upper frame toward a side of the upright position in a rocking direction of the upper frame.

Further, the assist mechanism is configured such that in a state in which the upper frame is located on a side of the laid-down position with respect to a boundary position between the upright position and the laid-down position, a rocking force applied to the upper frame toward the upright position by the urging mechanism is smaller than the rocking force applied to the upper frame toward the laid-down position due to the weight of the upper frame, and in a state in which the upper frame is located in a predetermined range from the boundary position on the side of the upright position, the rocking force applied to the upper frame toward the upright position by the urging mechanism is larger than the rocking force applied to the upper frame toward the laid-down position due to the weight of the upper frame.

Further, the assist mechanism includes an upper coupling shaft that rotatably couples the upper frame and the urging mechanism, and a lower coupling shaft that rotatably couples the lower frame and the urging mechanism, the urging mechanism is capable of extending and contracting, and is configured to urge to separate the upper coupling shaft and the lower coupling shaft from each other in an extension and contraction direction, in a state in which the upper frame is set in the upright position, the upper coupling shaft is located on the side of the upright position in the rocking direction with respect to a straight line passing through the lower coupling shaft and the rocking shaft in a side view, and in a state in which the upper frame is set in the laid-down position, the upper coupling shaft is located on the side of the laid-down position in the rocking direction with respect to the straight line.

Further, the assist mechanism includes a coupler rotatably coupled with the urging mechanism through the upper coupling shaft, and a screw that fixes the coupler to the upper frame, and the coupler is configured to enable the screw to be inserted through in the extension and contraction direction of the urging mechanism, and holds the urging mechanism in a contracted state with the screw screwed into the upper frame.

Further, the screw is provided such that in a state in which the upper frame is located in a predetermined position in the rocking direction, an axial line extending in an insertion direction of the screw and an axial line extending in the extension and contraction direction of the urging mechanism coincide with each other in a side view.

Further, the coupler includes a cutout portion that avoids at least a portion of the urging mechanism in a state in which the upper frame is set in the laid-down position.

Further, the urging mechanism is a damper mechanism to provide an urging force by a screw.

Further, the assist mechanism is located on an outer side in a left-right direction of the upper frame and the lower frame.

Further, the assist mechanism is located on an inner side in a left-right direction with respect to an outer end portion in the left-right direction of a fender that is disposed to cover a rear wheel of the work vehicle.

Further, in a state in which the upper frame is set in the laid-down position, an end portion on an opposite side of a lower frame side is located below a lower end of the assist mechanism.

Further, the protective frame is divided into a lower split body defining and functioning as the first frame located on a vehicle body side, and an upper split body defining and functioning as the second frame located on an upper side, and the upper split body defines a Roll Over Protection Structure (ROPS) that is pivotally coupled to be rotatable between a vertical acting posture and a folded posture folded downward with respect to the lower split body and that stands up from a vehicle body, the assist mechanism includes a gas damper provided at the lower split body and the upper split body, the gas damper is attached to be in a free state in which neither an extension force nor a contraction force is generated when the upper split body is located in an intermediate position between the vertical acting posture and the folded posture, and a position holding mechanism capable of fixing and releasing a position of the upper split body in a rotation position corresponding to the intermediate position is provided.

Further, in a work vehicle according to a preferred embodiment of the present invention, the upper split body is supported to be rotatable to a first rotation position corresponding to the vertical acting posture, a second rotation position corresponding to the intermediate position, and a third rotation position corresponding to the folded posture, and the position holding mechanism is capable of fixing and releasing the position in each of the first rotation position, the second rotation position, and the third rotation position.

Further, the position holding mechanism includes a coupling pin that is inserted into an insertion hole in the upper split body and an insertion hole in the lower split body to be insertable and removable, a plurality of insertion holes are located at different positions in a circumferential direction as either the insertion hole in the upper split body or the insertion hole in the lower split body, and holding the position is enabled in each of the first rotation position, the second rotation position, and the third rotation position by changing insertion of the coupling pin into any of the plurality of insertion holes.

The following advantageous effects are achieved by various preferred embodiments of the present invention.

In a work vehicle according to a preferred embodiment of the present invention, it is possible to assist the rocking operation of the protective frame provided on the rear side of the seat.

In a work vehicle according to a preferred embodiment of the present invention, an urging force of the urging mechanism can be used to assist the rocking operation of the upper frame.

In a work vehicle according to a preferred embodiment of the present invention, the force needed for the rocking operation of the protective frame can be further reduced.

In a work vehicle according to a preferred embodiment of the present invention, an impact can be mitigated, while assisting of the rocking operation, in displacing the upper frame to the side of the upright position is enabled.

In a work vehicle according to a preferred embodiment of the present invention, the attachment performance of the urging mechanism to the upper frame can be improved.

In a work vehicle according to a preferred embodiment of the present invention, interference between the urging mechanism and the coupler can be prevented in a state in which the upper frame is set in the laid-down position.

In a work vehicle according to a preferred embodiment of the present invention, the configuration of the urging mechanism can be simplified.

In a work vehicle according to a preferred embodiment of the present invention, the assist mechanism can be disposed in a suitable position.

In a work vehicle according to a preferred embodiment of the present invention, the assist mechanism is capable of preventing contact with surrounding objects.

In a work vehicle according to a preferred embodiment of the present invention, the protective frame can be made compact in the front-rear direction.

In a work vehicle according to a preferred embodiment of the present invention, the workload of the operator in performing the posture change work of the ROPS can be reduced, and in addition, the gas damper can be attached and detached easily.

In a work vehicle according to a preferred embodiment of the present invention, the configuration of the position holding mechanism can be simplified.

In a work vehicle according to a preferred embodiment of the present invention, the position can be reliably held in each rotation position by a simple configuration in which insertion of the coupling pin is changed between the plurality of insertion holes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
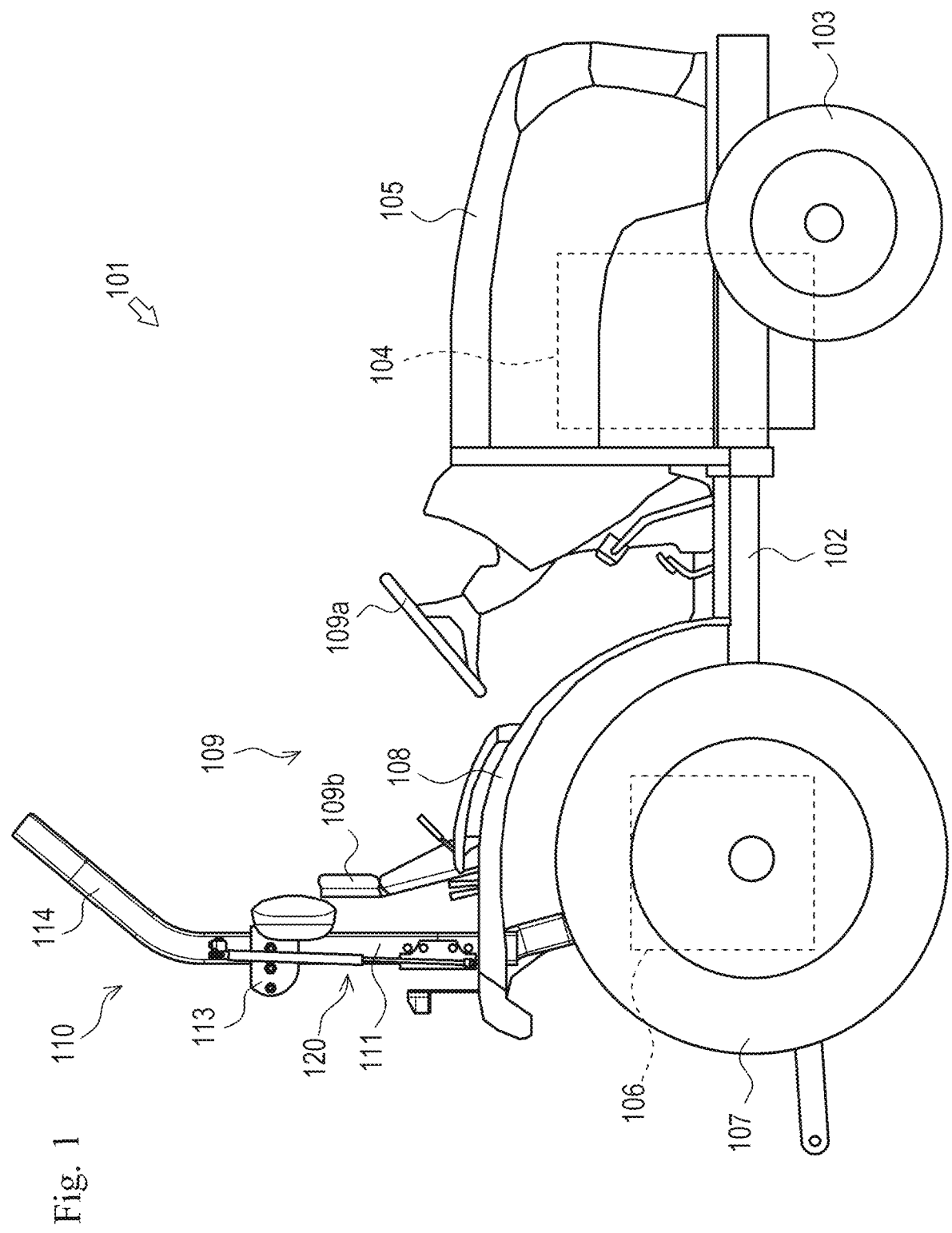
FIG. 1 is a side view showing an overall configuration of a tractor according to a first preferred embodiment of the present invention.

First, an overall configuration of a tractor 101 according to a first preferred embodiment of the present invention will be described with reference to FIGS. 1 and 2.

It is to be noted that in the present preferred embodiment, the tractor 101 will be described as an example of a work vehicle, but the present invention is not limited to this. That is, the work vehicle may be any other agricultural vehicle, construction vehicle, industrial vehicle, or the like.

The tractor 101 mainly includes a body frame 102, front wheels 103, an engine 104, a bonnet 105, a mission case 106, rear wheels 107, fenders 108, a driver's seat 109, a protective frame 110, and an assist mechanism 120.

As shown in FIG. 1, the body frame 102 is disposed such that its longitudinal direction is oriented in a front-rear direction. A front portion of the body frame 102 is supported by a pair of left and right front wheels 103 through a front axle mechanism (not shown). The engine 104 is provided at a front portion of the body frame 102. The engine 104 is covered with the bonnet 105. A mission case 106 shown in FIGS. 1 and 2 is provided at a rear portion of the body frame 102. The mission case 106 includes a transmission device (not shown) and the like. The mission case 106 is supported by a pair of left and right rear wheels 107 through a rear axle mechanism (not shown). The rear wheels 107 are covered with the left and right fenders 108 from above.

The power of the engine 104 is changed by the transmission, and then can be transmitted to the front wheels 103 via the front axle mechanism and also to the rear wheels 107 via the rear axle mechanism. The front wheels 103 and the rear wheels 107 are rotationally driven by the power of the engine 104, so that the tractor 101 can travel.

As shown in FIG. 1, the driver's seat 109 is a structure on which the driver sits. The driver's seat 109 is located on a rear side of the engine 104. In the driver's seat 109, a steering wheel 109a to adjust the steering angle of the front wheels 103, a seat 109b on which the driver is seated, and various operating tools such as a brake pedal, an accelerator pedal, and a clutch pedal are disposed.

The protective frame 110 is a frame to protect the driver who is seated on the driver's seat 109, when the tractor 101 rolls over. As will be described later, the protective frame 110 is configured so that an upper frame 114 of an upper portion is capable of rocking with respect to lower frames 111 of a lower portion. The rocking operation of the protective frame 110 (the upper frame 114) can be manually performed by an operator. The assist mechanism 120 assists the rocking operation of the protective frame 110. Hereinafter, details of the protective frame 110 and the assist mechanism 120 will be described with reference to FIGS. 1 to 8.

The protective frame 110 is provided on the rear side of the seat 109b. The protective frame 110 includes the lower frames 111, the upper frame 114, rocking shafts 117, and fixing pins 118.

Figure 2:
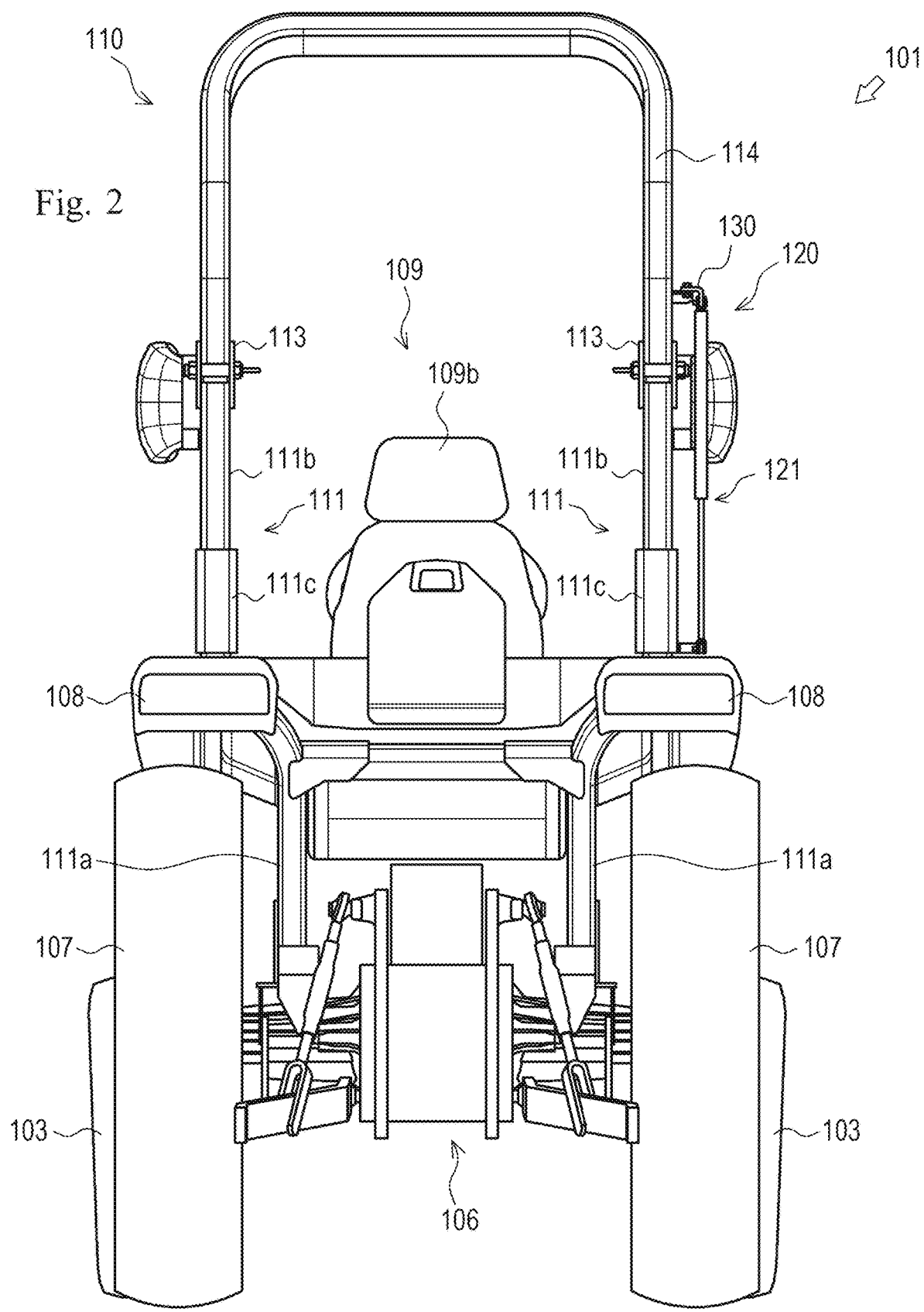
FIG. 2 is a rear view showing the tractor.

The lower frames 111 shown in FIGS. 2 to 6 define a lower portion of the protective frame 110. The lower frames 111 are fixed to the mission case 106 on the rear side of the seat 109b. As shown in FIG. 2, a pair of lower frames 111 are provided to extend upward from both the left and right sides of the mission case 106. The lower frames 111 each include a first lower member 111a, a second lower member 111b, a joint member 111c, a lower damper coupling portion 112, and an upper frame coupling portion 113.

Figure 3:
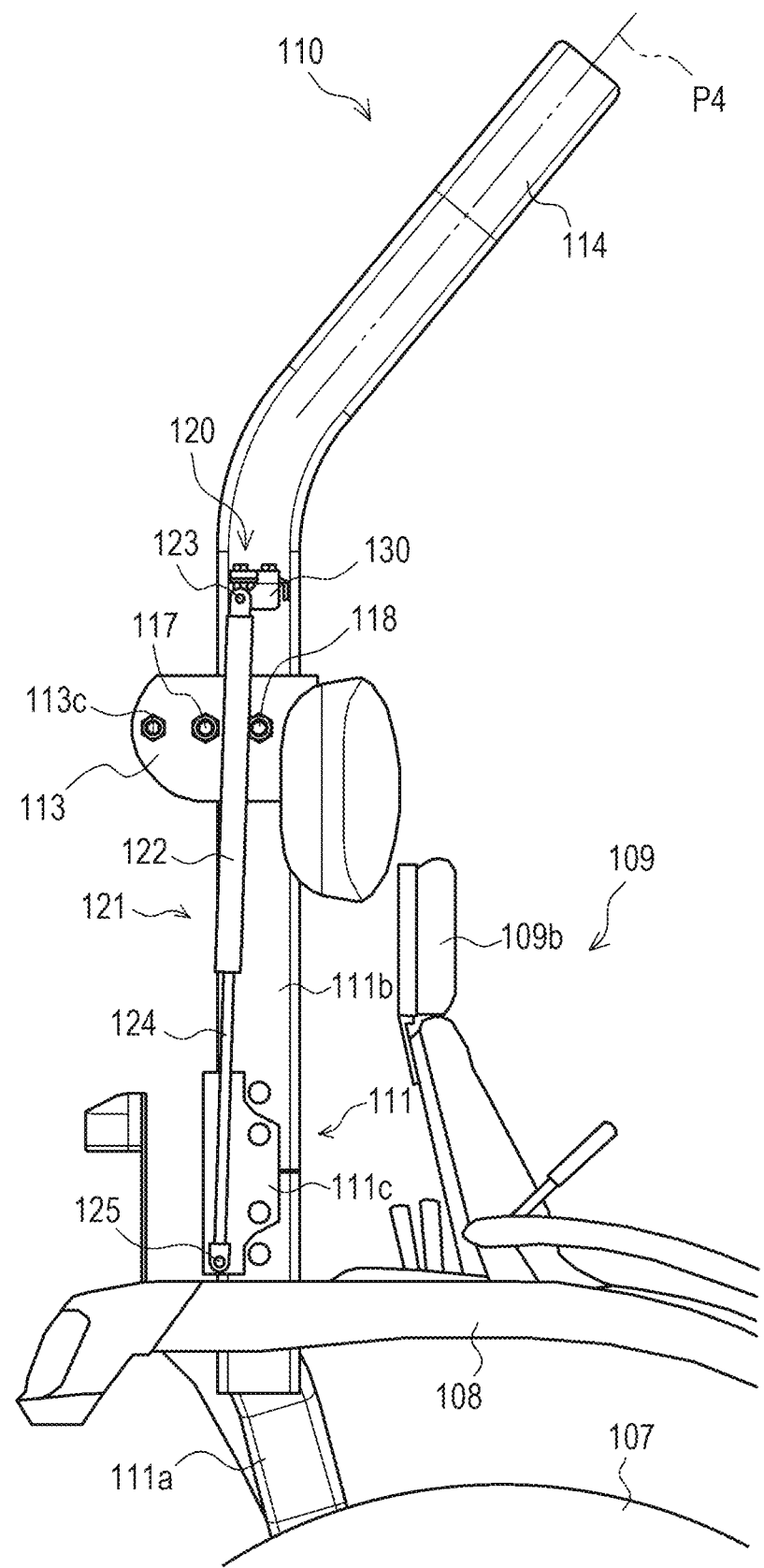
FIG. 3 is a side view showing a protective frame in which an upper frame is set in an upright position.
Figure 4:
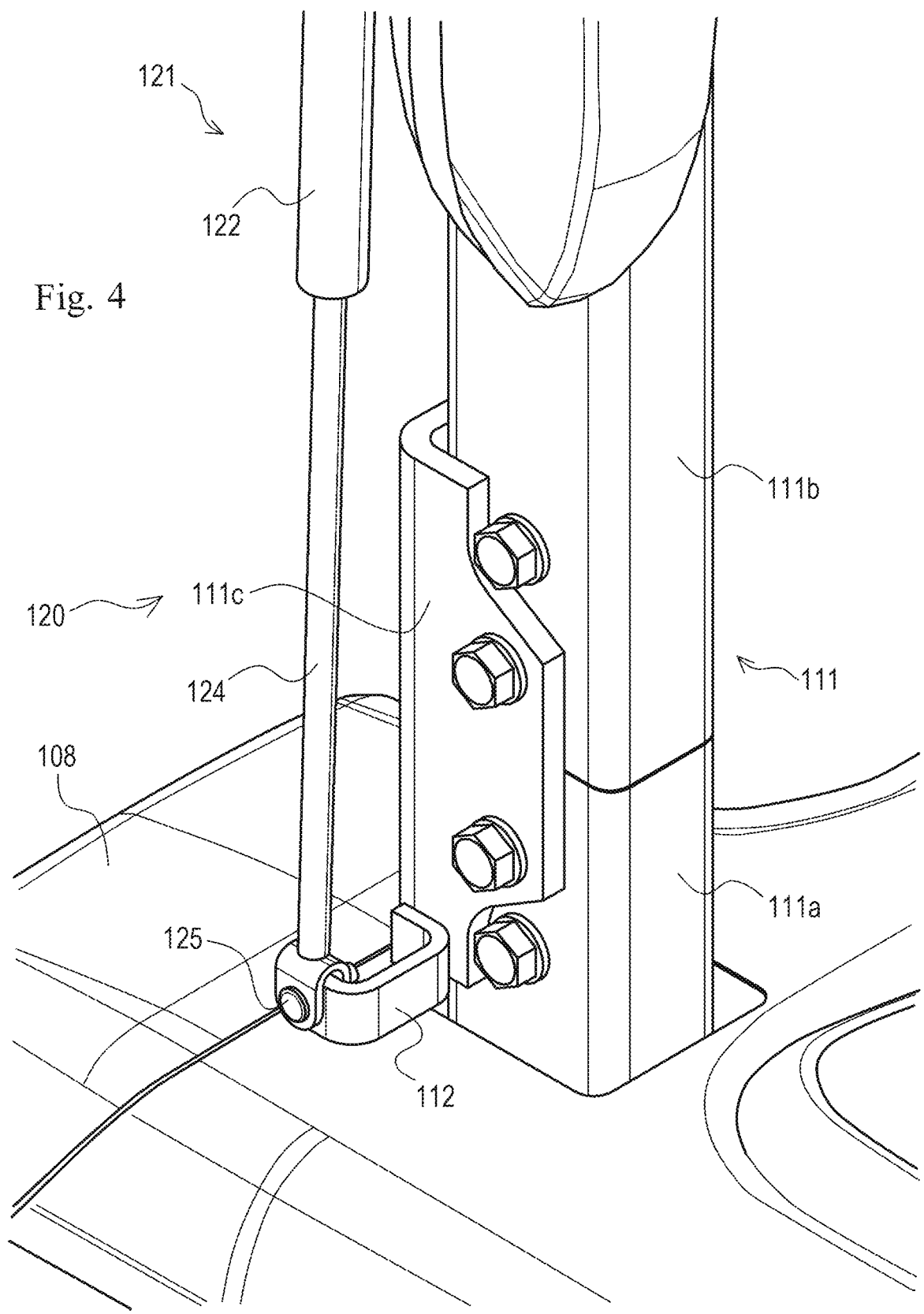
FIG. 4 is an enlarged perspective view showing a lower frame.

The first lower member 111a shown in FIGS. 2 to 4 defines a lower portion of the lower frame 111. The first lower member 111a is fixed to the mission case 106 and to extend upward. The first lower member 111a projects upward to penetrate through an opening portion formed in the fender 108, and an upper end portion is located above the fender 108. The first lower member 111a includes a square steel pipe.

The second lower member 111b defines an upper portion of the lower frame 111. The second lower member 111b extends upward from an upper end portion of the first lower member 111a. A lower end portion of the second lower member 111b is coupled with the upper end portion of the first lower member 111a. The second lower member 111b includes a square steel pipe in the same manner as the first lower member 111a.

The joint member 111c shown in FIG. 4 couples the first lower member 111a and the second lower member 111b. The joint member 111c is disposed to straddle over a boundary between the first lower member 111a and the second lower member 111b. The joint member 111c has a letter L-shape in a plan view, and is disposed to cover outer surfaces in a left-right direction (surfaces facing outward with the center in the left-right direction of the tractor 101 used as a reference) and rear surfaces of the first lower member 111a and the second lower member 111b. The joint member 111c is fixed to the first lower member 111a and the second lower member 111b.

The lower damper coupling portion 112 is a structure with which a lower end portion of a damper mechanism 121, which will be described later, is coupled. The lower damper coupling portion 112 is provided on the joint member 111c of the lower frame 111 on the right side of the pair of lower frames 111. The lower damper coupling portion 112 is projects to the right side from a right surface of the joint member 111c. The lower damper coupling portion 112 has a letter U-shape in a plan view, and is disposed to open rearward. A left end portion of the lower damper coupling portion 112 is fixed to an outer surface in the left-right direction of the joint member 111c, and a right end portion of the lower damper coupling portion 112 is coupled with the damper mechanism 121. A hole portion (not shown) through which a lower coupling shaft 125, which will be described later, is inserted is located at the right end portion of the lower damper coupling portion 112.

Figure 5:
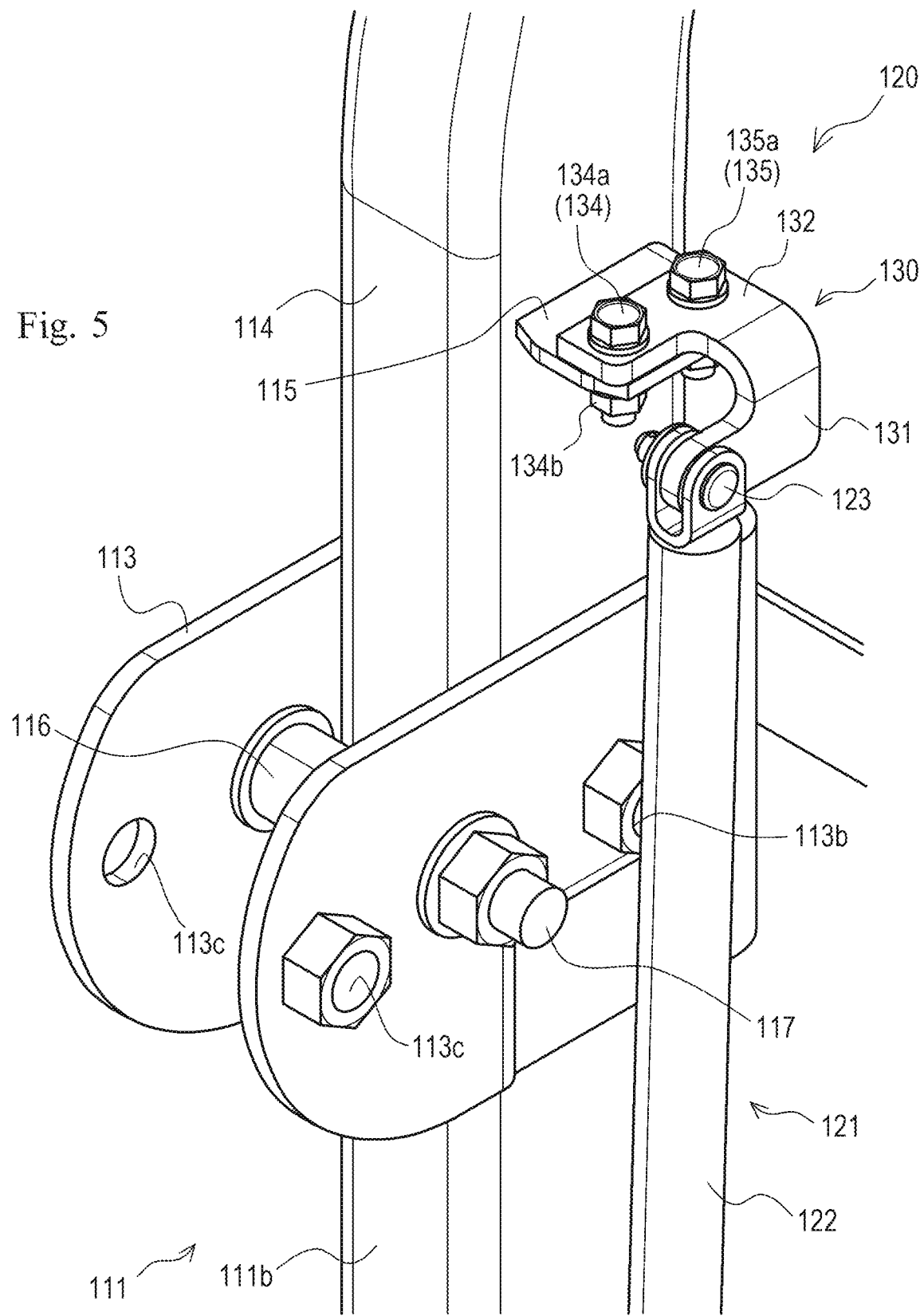
FIG. 5 is an enlarged perspective view showing a coupler portion between the upper frame and the lower frame.
Figure 6:
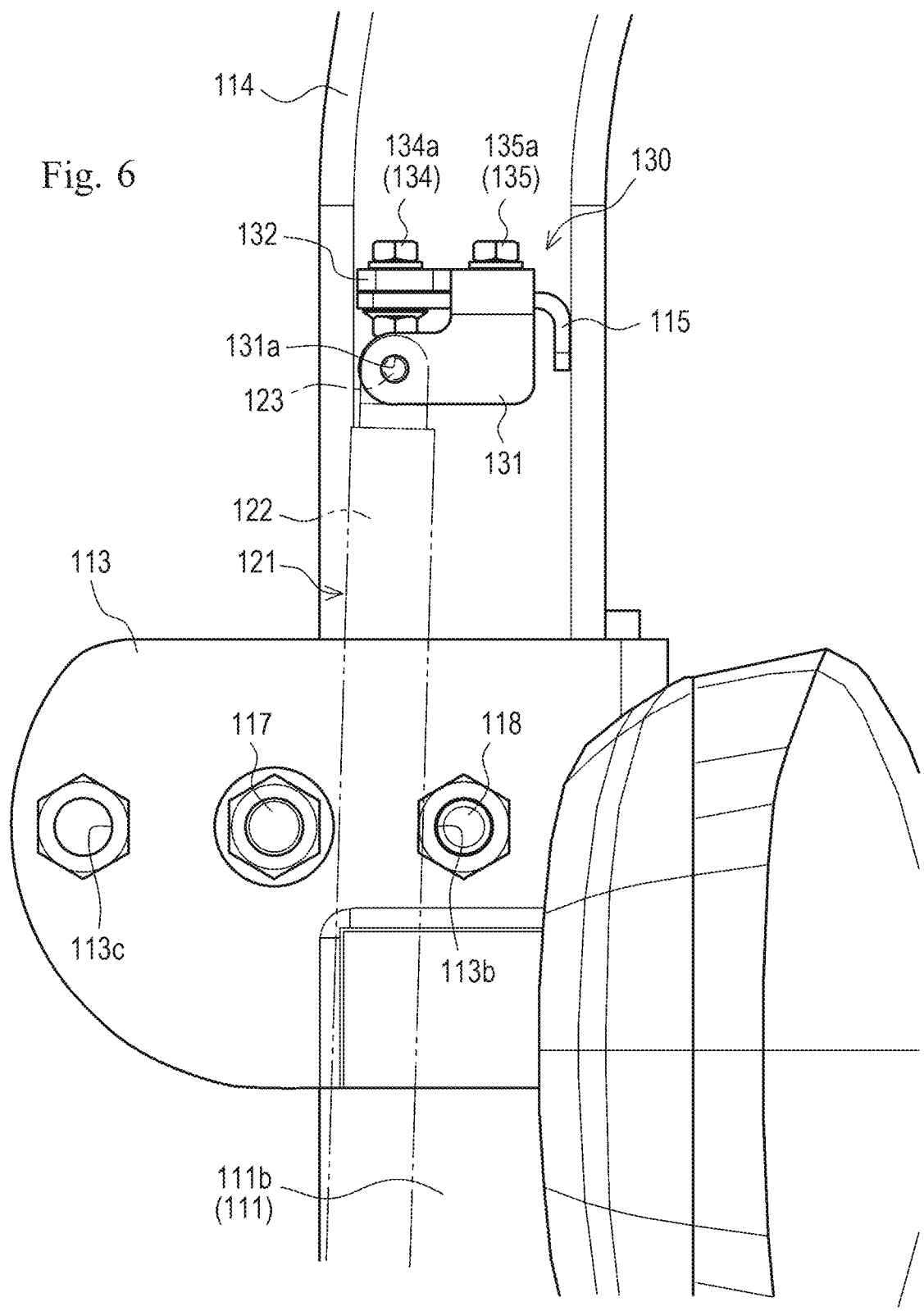
FIG. 6 is a side view showing an upper end portion of a damper mechanism.

The upper frame coupling portion 113 shown in FIGS. 5 and 6 is a structure with which the upper frame 114, which will be described later, is coupled. The upper frame coupling portion 113 is provided at an upper end portion of the second lower member 111b. The upper frame coupling portion 113 has a letter U-shape in a plan view, and is disposed to open rearward. The upper frame coupling portion 113 is disposed to accommodate the upper end portion of the second lower member 111b inside the opening. The upper frame coupling portion 113 is disposed to cover an outer surface in the left-right direction, an inner surface in the left-right direction, and a front surface of the upper end portion of the second lower member 111b. A rear portion of the upper frame coupling portion 113 has a shape that projects rearward with respect to the upper end portion of the second lower member 111b. The upper frame coupling portion 113 includes shaft holes 113a, first pin insertion holes 113b, and second pin insertion holes 113c.

The shaft holes 113a are holes through which the rocking shaft 117, which will be described later, is inserted. The shaft holes 113a are provided to allow penetration in the left-right direction. The shaft holes 113a are provided at substantially the center in the front-rear direction of the upper frame coupling portion 113.

The first pin insertion holes 113b are holes through which the fixing pins 118, which will be described later, are respectively inserted, in an upright position P4. The first pin insertion holes 113b are provided to allow penetration in the left-right direction. The first pin insertion holes 113b are respectively provided on a front side of the shaft holes 113a.

The second pin insertion holes 113c are holes through which the fixing pins 118, which will be described later, are respectively inserted, in a laid-down position P1. The second pin insertion holes 113c are provided to allow penetration in the left-right direction. The second pin insertion holes 113c are respectively provided on a rear side of the shaft holes 113a.

Figure 14:
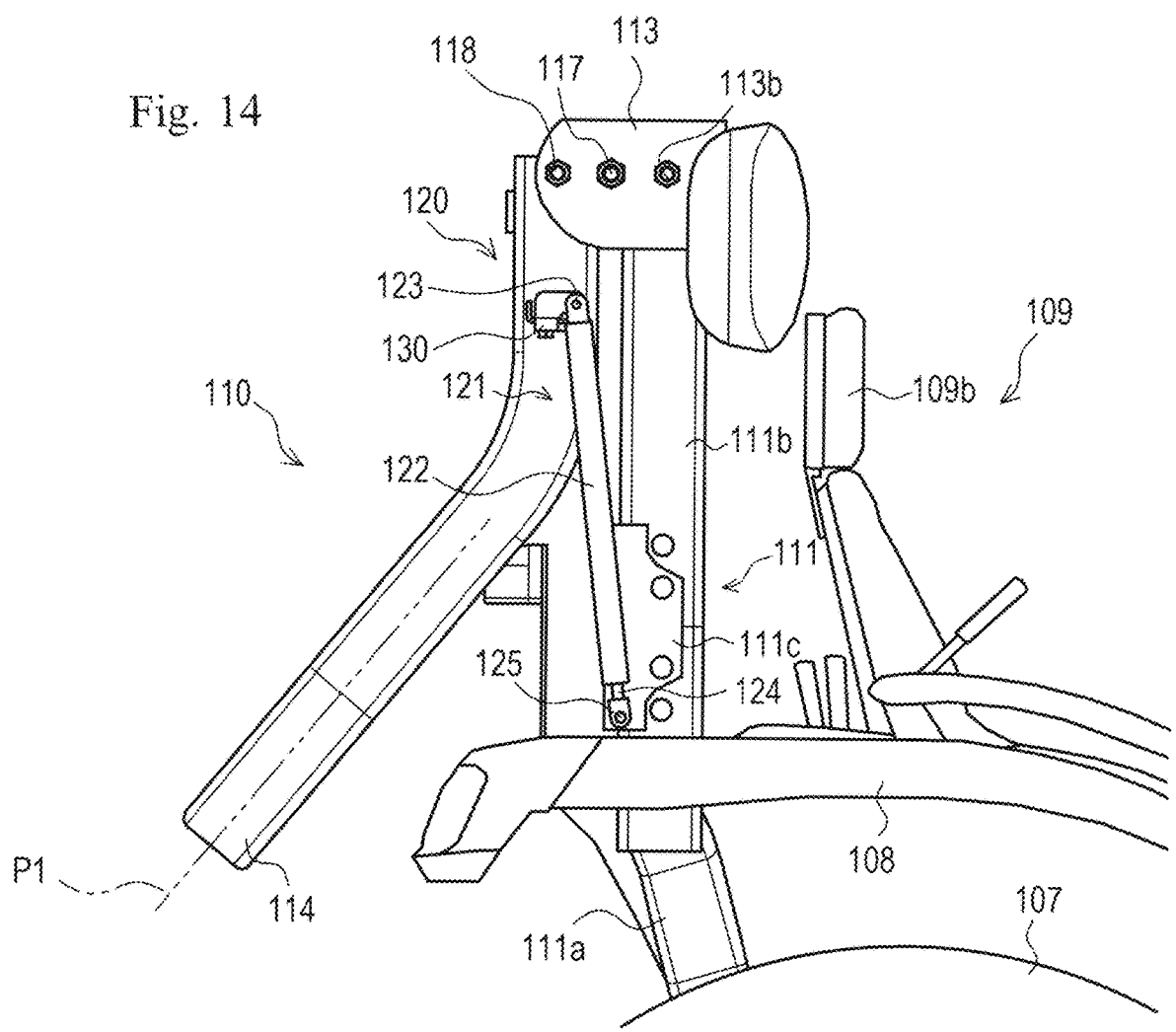
FIG. 14 is a side view showing the protective frame in which the upper frame is set in a laid-down position.

The upper frame 114 shown in FIGS. 2, 3, 6, and 8 defines an upper portion of the protective frame 110. The upper frame 114 is coupled with the upper frame coupling portion 113 of the lower frame 111 through the rocking shaft 117, which will be described later, so as to be capable of rocking in the front-rear direction. The upper frame 114 can be displaced to the upright position P4, in which the upper frame 114 stands up above the lower frame 111 as shown in FIG. 3, and to the laid-down position P1, in which the upper frame 114 is folded with respect to the lower frame 111 as shown in FIG. 14. The upper frame 114 includes a square steel pipe in the same manner as the second lower member 111b and the first lower member 111a of the lower frame 111.

As shown in FIG. 2, the upper frame 114 has a letter U-shape in a rear view in the upright position P4, and a pair of end portions on an opening side (end portions on the lower frame 111 side) are respectively coupled with the upper frame coupling portions 113 of the pair of lower frames 111. The end portions of the upper frame 114 on the lower frame 111 side are respectively accommodated inside the openings of the upper frame coupling portions 113.

As shown in FIG. 3, the upper frame 114 has a configuration in which the lower portion (the portion on the lower frame 111 side) extends upward in the vertical direction from the lower frames 111 in a state in which the upper frame 114 is set in the upright position P4. Further, in the upper frame 114, the upper portion (the portion on the opposite side of the lower frame side) bends forward in the state in which the upper frame 114 is set in the upright position P4. In the state in which the upper frame 114 is set in the upright position P4, a front surface of the end portion on the lower frame 111 side abuts the inside of the upper frame coupling portion 113. The upper frame 114 includes an upper damper coupling portion 115 and a tubular portion 116.

The upper damper coupling portion 115 shown in FIGS. 5 to 9 is a portion with which a coupler 130, which will be described later, is coupled. The upper damper coupling portion 115 projects from a right surface of the upper frame 114 to the right side. The upper damper coupling portion 115 has a plate shape with a thickness direction arranged along the vertical direction in the upright position P4, and has a shape in which a front end portion bends downward. The upper damper coupling portion 115 includes a first bolt insertion hole 115a and a second bolt insertion hole 115b.

Figure 9:
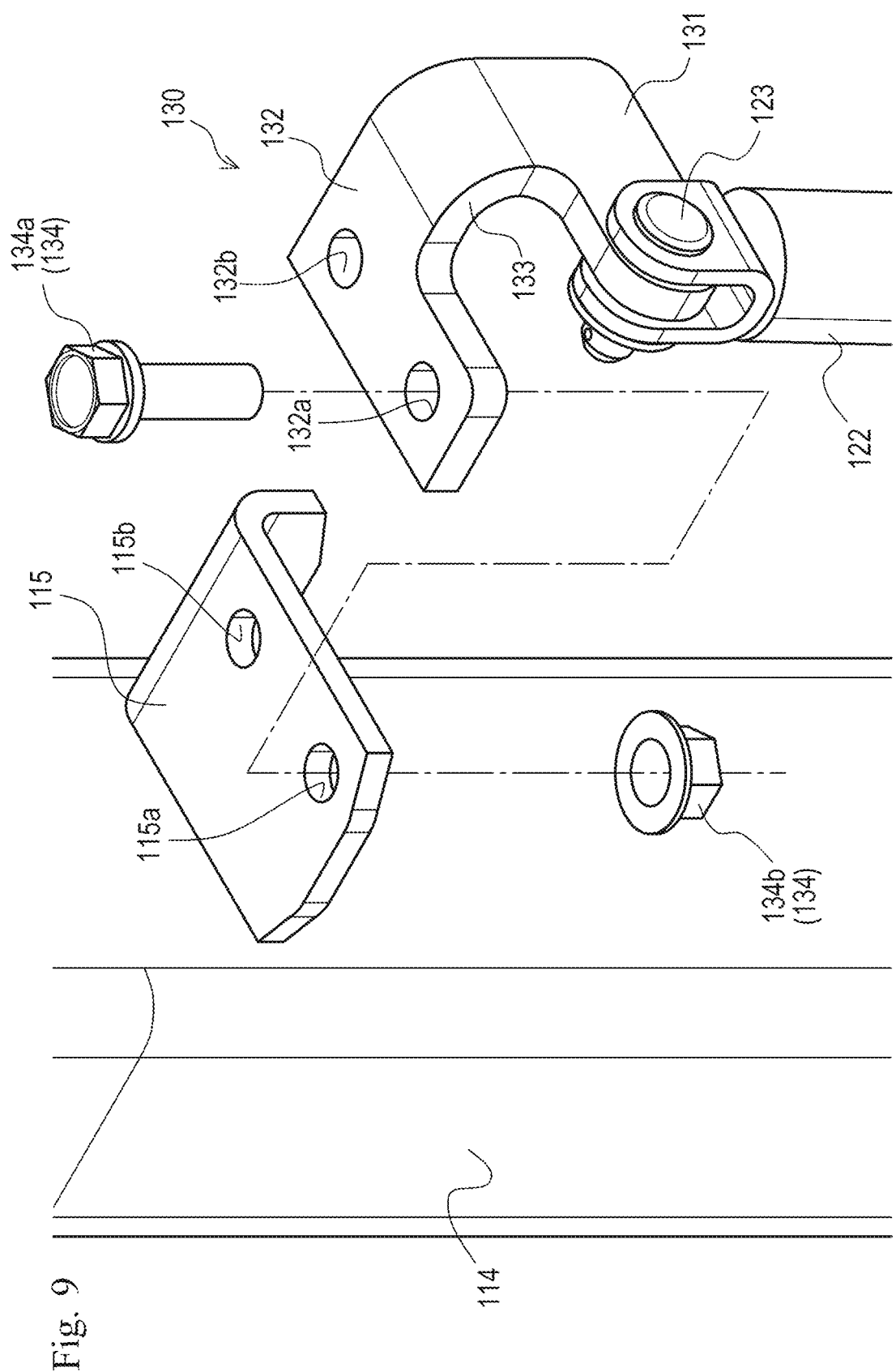
FIG. 9 is an enlarged perspective view showing a state before the coupler is attached to an upper damper coupling portion.

The first bolt insertion hole 115a is a hole that vertically penetrates through the upper damper coupling portion 115, in the upright position P4. A first bolt 134a, which will be described later, can be inserted into the first bolt insertion hole 115a. As shown in FIG. 9, the first bolt insertion hole 115a is located at a rear portion of the upper damper coupling portion 115.

The second bolt insertion hole 115b is a hole that vertically penetrates through the upper damper coupling portion 115, in the upright position P4. A second bolt 135a, which will be described later, can be inserted into the second bolt insertion hole 115b. The second bolt insertion hole 115b is located at a front portion of the first bolt insertion hole 115a.

Figure 8:
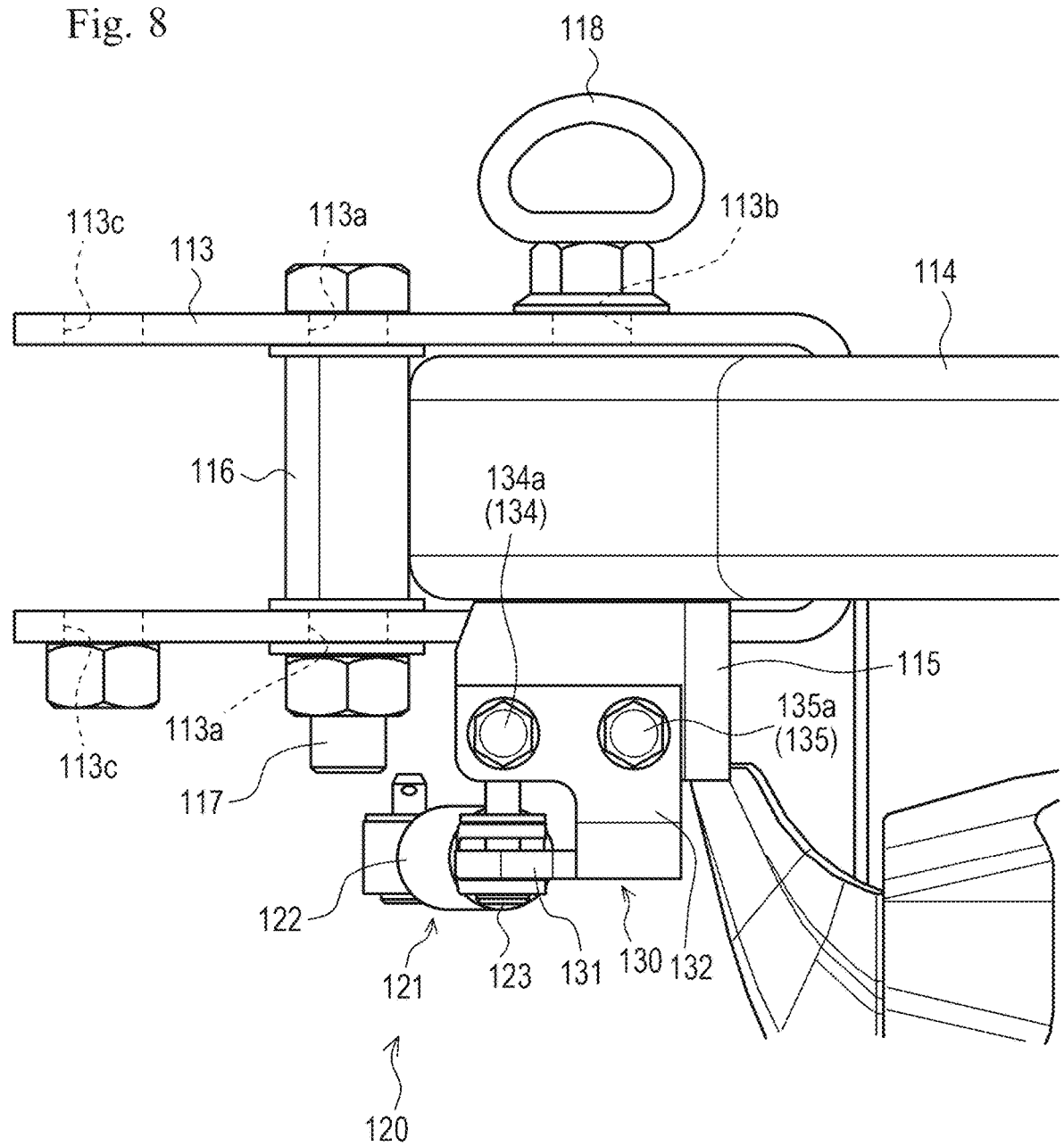
FIG. 8 is a plan view showing the upper end portion of the damper mechanism.

The tubular portion 116 shown in FIGS. 5 and 8 is inserted by the rocking shaft 117, which will be described later. The tubular portion 116 is provided on a rear surface at the end portion of the upper frame 114 on the lower frame 111 side. The tubular portion 116 has a cylindrical shape including a bore penetrating in the left-right direction. In the tubular portion 116, such a bore overlaps the shaft holes 113a of the upper frame coupling portion 113 in a side view.

Further, a hole (not shown) overlapping the first pin insertion holes 113b in a side view in the upright position P4, and a hole (not shown) overlapping the second pin insertion holes 113c in a side view in the laid-down position P1 are located at the end portion of the upper frame 114 on the lower frame 111 side.

The rocking shaft 117 shown in FIGS. 5 to 8 couples the lower frames 111 and the upper frame 114 so as to be capable of rocking the lower frames 111 and the upper frame 114. The rocking shaft 117 is disposed with an axial direction oriented in the left-right direction. As shown in FIG. 8, the rocking shaft 117 is inserted into the shaft holes 113a of the upper frame coupling portions 113 and the bore in the tubular portion 116 of the upper frame 114. In the example of the drawing, an example is shown such that the rocking shaft 117 is defined by a bolt inserted into the shaft holes 113a and the bore in the tubular portion 116. The bolt is attached to the lower frame 111 and the upper frame 114 by being fastened with a nut while being inserted into the shaft holes 113a and the bore in the tubular portion 116.

The fixing pin 118 regulates the rocking of the upper frame 114 set in the upright position P4 or the laid-down position P1. The fixing pin 118 has a columnar shape with the axial direction oriented in the left-right direction. The fixing pin 118 is detachably inserted into the lower frame 111 and the upper frame 114 through the first pin insertion holes 113b and the second pin insertion holes 113c of the upper frame coupling portion 113.

In the example of the drawing, an example is shown such that a grip portion is provided at one end portion in the left-right direction of the fixing pin 118. Further, the fixing pin 118 is provided with a stopper (not shown) for the lower frame 111 and the upper frame 114 at the other end portion in the left-right direction.

As shown in FIG. 3, in the state in which the upper frame 114 is set in the upright position P4, by inserting the fixing pin 118 into the first pin insertion holes 113b and the holes in the upper frame 114, the rocking of the upper frame 114 set in the upright position P4 can be regulated. Further, as shown in FIG. 14, in a state in which the upper frame 114 is set in the laid-down position P1, by inserting the fixing pin 118 into the second pin insertion holes 113c and the holes in the upper frame 114, the rocking of the upper frame 114 set in the laid-down position P1 can be regulated.

The assist mechanism 120 shown in FIGS. 2 to 8 assists the rocking operation of the upper frame 114 by urging the upper frame 114 in the rocking direction. The assist mechanism 120 is provided on the right side of the protective frame 110. The assist mechanism 120 includes the damper mechanism 121, the coupler 130, a first stopper 134, and a second stopper 135. It is to be noted that in the following description, unless otherwise specified, the assist mechanism 120 will be described with the state in which the upper frame 114 is set in the upright position P4 used as a reference.

The damper mechanism 121 is extendable and contractible, and urges the upper frame 114 in an extension direction. The damper mechanism 121 is rotatably coupled with the lower frame 111 and the upper frame 114. As shown in FIG. 3, the assist mechanism 120 is disposed with its longitudinal direction oriented in an up-down direction. The damper mechanism 121 defines a gas spring that urges the upper frame 114 with the pressure of the gas enclosed in the inside. The damper mechanism 121 includes a cylinder tube 122 and a piston rod 124.

The cylinder tube 122 shown in FIG. 5 defines an upper portion of the damper mechanism 121. The cylinder tube 122 is a cylindrical member in which gas is enclosed. The cylinder tube 122 is rotatably coupled with the upper frame 114 through the coupler 130, which will be described later. The cylinder tube 122 includes an upper coupling shaft 123.

The upper coupling shaft 123 is a shaft that is rotatably coupled with the coupler 130, which will be described later. The upper coupling shaft 123 couples an upper end portion of the cylinder tube 122 and the coupler 130. The upper coupling shaft 123 is a pin-shaped structure having a substantially cylindrical shape. The upper coupling shaft 123 is disposed so that the axial direction is oriented in the left-right direction.

The piston rod 124 shown in FIG. 4 defines a lower portion of the damper mechanism 121. The piston rod 124 is a substantially cylindrical structure that can be accommodated inside the cylinder tube 122. The piston rod 124 is urged in a direction of projecting from the cylinder tube 122 (a direction in which the damper mechanism 121 extends) by receiving the pressure of the gas enclosed in the cylinder tube 122. Further, the piston rod 124 can be displaced in the direction of being accommodated inside the cylinder tube 122 (the direction in which the damper mechanism 121 contracts) against the pressure of the gas enclosed in the cylinder tube 122. The piston rod 124 includes the lower coupling shaft 125.

The lower coupling shaft 125 is a shaft that is rotatably coupled with the lower frame 111. The lower coupling shaft 125 couples a lower end portion of the piston rod 124 and the lower damper coupling portion 112 of the lower frame 111. The lower coupling shaft 125 is a pin-shaped structure having a substantially cylindrical shape. The lower coupling shaft 125 is disposed so that the axial direction is oriented in the left-right direction. As shown in FIG. 4, the lower coupling shaft 125 is coupled with the lower damper coupling portion 112 by being inserted into a hole in the right end portion of the lower damper coupling portion 112.

The damper mechanism 121 is configured to urge the upper coupling shaft 123 and the lower coupling shaft 125 to be separated from each other in the extension direction. The damper mechanism 121 extends and contracts in accordance with the rocking of the upper frame 114, while being coupled with the upper frame 114 and the lower frame 111.

The coupler 130 shown in FIGS. 5 to 11 couples the upper frame 114 and the piston rod 124. The coupler 130 includes a coupling piece portion 131, a fixing piece portion 132, and a cutout portion 133.

Figure 7:
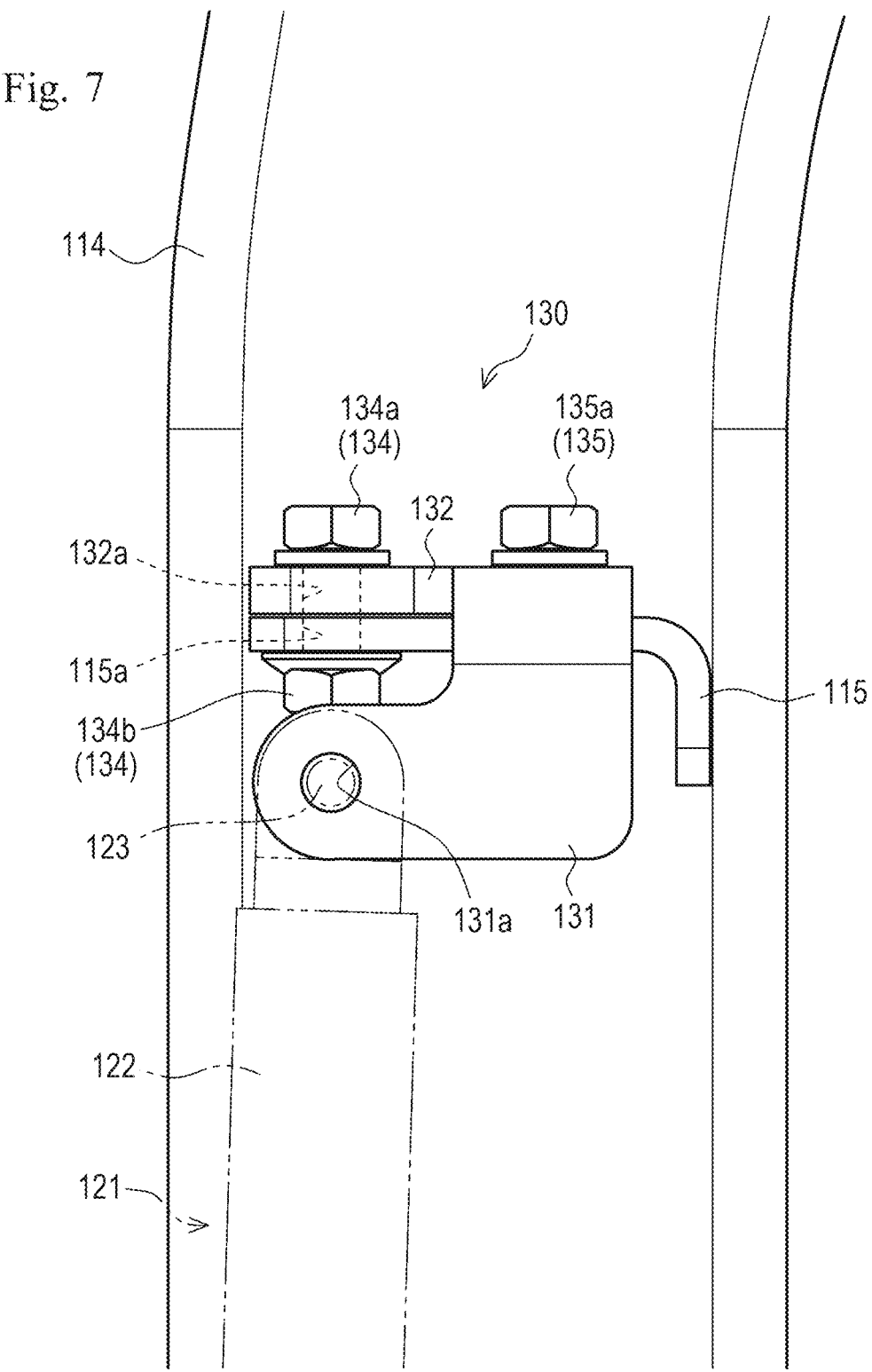
FIG. 7 is an enlarged side view showing the upper end portion of the damper mechanism and a coupler.

The coupling piece portion 131 is a structure with which the upper end portion of the cylinder tube 122 is coupled through the upper coupling shaft 123. The coupling piece portion 131 is disposed so that the thickness direction corresponds to the left-right direction. As shown in FIGS. 6 and 7, the coupling piece portion 131 includes a hole portion 131a through which the upper coupling shaft 123 is inserted. The hole portion 131a is provided at a rear side of the coupling piece portion 131 to allow penetration in the left-right direction.

The fixing piece portion 132 is a structure coupled with the upper damper coupling portion 115 of the upper frame 114. The fixing piece portion 132 is disposed so that the thickness direction corresponds to the up-down direction. The fixing piece portion 132 is provided to extend to the left side from an upper end portion of the coupling piece portion 131. The coupler 130 has a letter L-shape in a front view with the fixing piece portion 132 and the upper coupling shaft 123. The coupler 130 is formed preferably by bending a plate formed of a metal material. The fixing piece portion 132 includes a first bolt insertion hole 132a and a second bolt insertion hole 132b.

The first bolt insertion hole 132a is a hole that penetrates through the fixing piece portion 132 in the up-down direction. The first bolt 134a, which will be described later, can be inserted through the first bolt insertion hole 132a. The first bolt insertion hole 132a is located at a rear portion of the fixing piece portion 132, as shown in FIG. 9. As shown in FIG. 7, the first bolt insertion hole 132a is located on an axial line of the damper mechanism 121 in a side view.

The second bolt insertion hole 132b is a hole that penetrates through the fixing piece portion 132 in the up-down direction. The second bolt 135a, which will be described later, can be inserted through the second bolt insertion hole 132b. The second bolt insertion hole 132b is located on a front side of the first bolt insertion hole 132a in the fixing piece portion 132.

Figure 15:
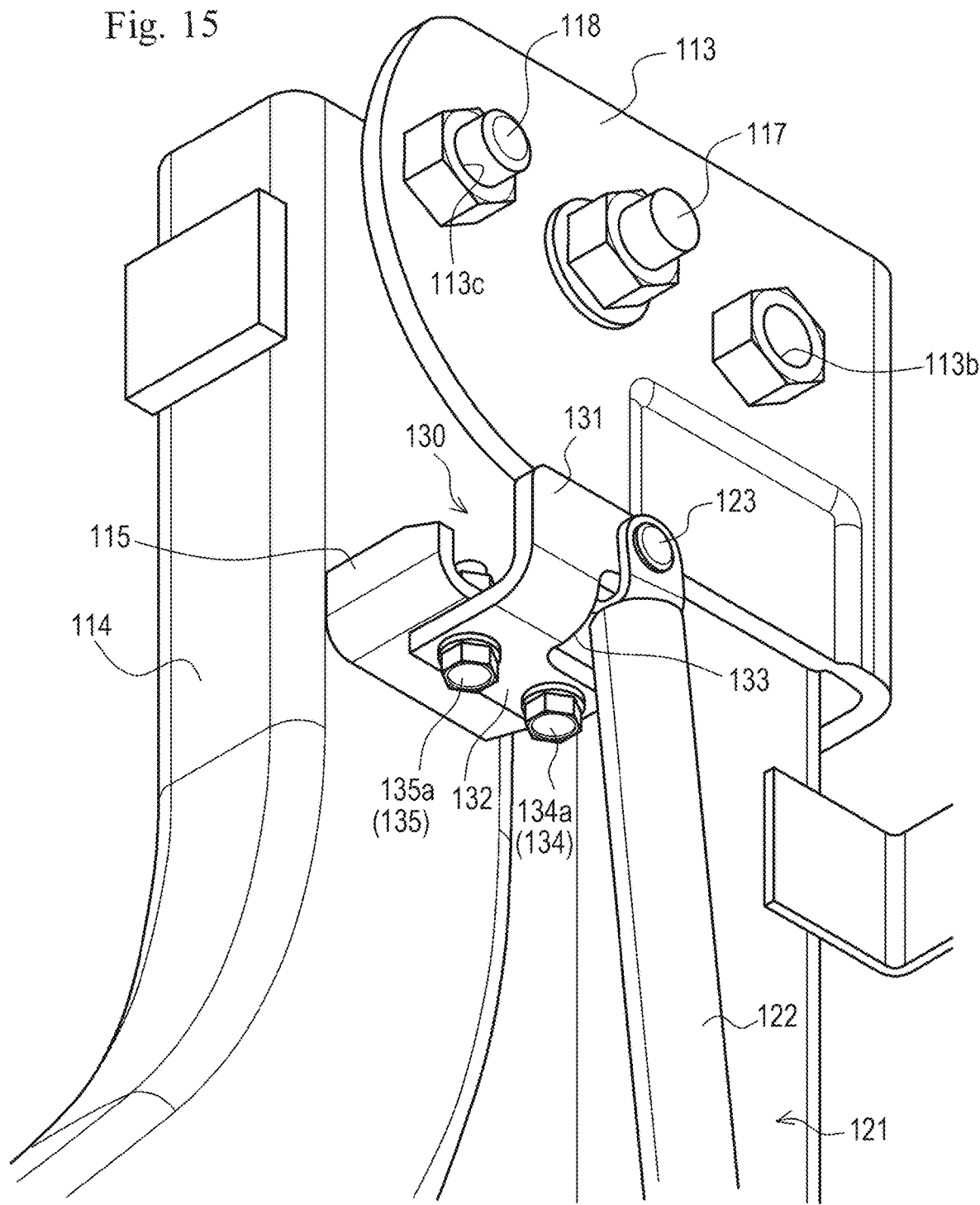
FIG. 15 is an enlarged perspective view showing the upper end portion of the damper mechanism in a state in which the upper frame is set in the laid-down position.

The cutout portion 133 shown in FIGS. 8, 9, and 15 is a structure obtained by partially cutting out the coupler 130. As shown in FIG. 15, the cutout portion 133 avoids interference with the upper end portion of the cylinder tube 122, in a state in which the upper frame 114 is set in the laid-down position P1. The cutout portion 133 is formed preferably by cutting out a connecting portion of the coupling piece portion 131 and the fixing piece portion 132. The cutout portion 133 has a shape formed by cutting out a portion defining a right rear corner portion of the coupler 130 in the connecting portion. As shown in FIG. 8, the cutout portion 133 has a shape that avoids at least a portion that overlaps the upper end portion of the cylinder tube 122 in a plan view.

The first stopper 134 fastens the fixing piece portion 132 of the coupler 130 and the upper damper coupling portion 115 of the upper frame 114. The first stopper 134 includes the first bolt 134a and a first nut 134b.

The first bolt 134a defines a male screw portion of the first stopper 134. The first bolt 134a is inserted into the first bolt insertion hole 132a and the first bolt insertion hole 115a. The first bolt 134a has an elongated shape in the insertion direction.

Figure 10:
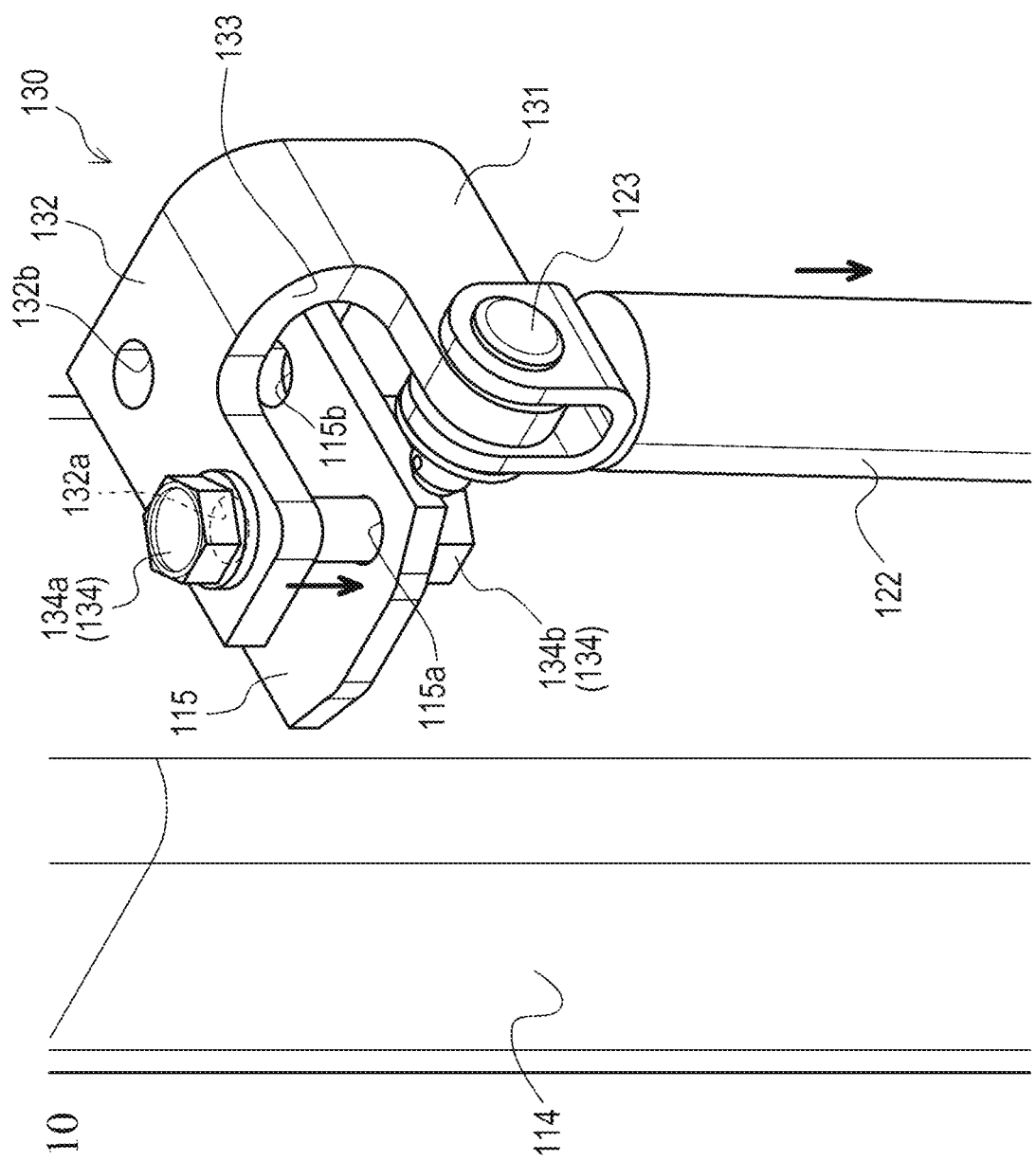
FIG. 10 is an enlarged perspective view showing a state before a first stopper is fastened to the upper damper coupling portion and the coupler.
Figure 11:
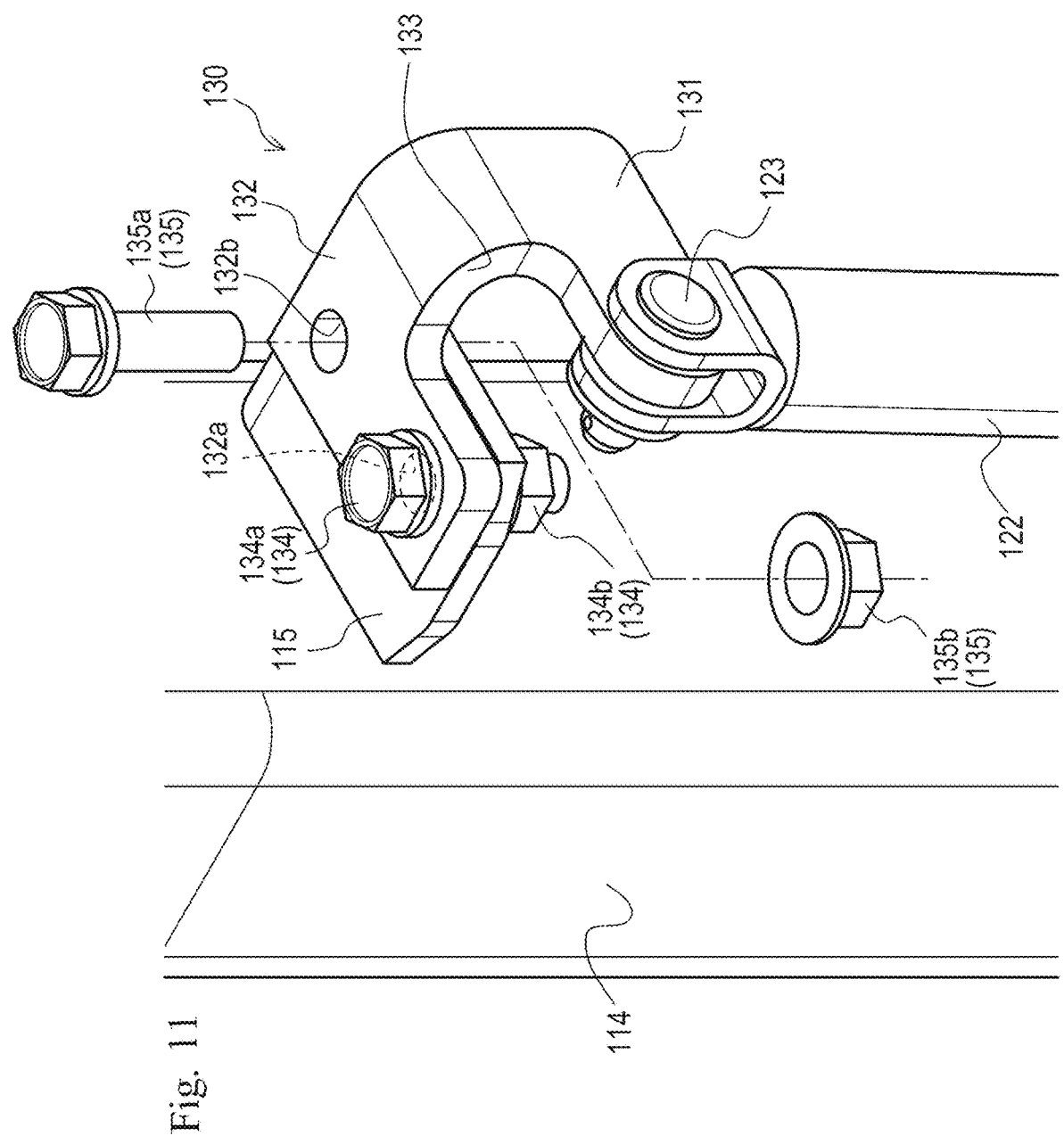
FIG. 11 is an enlarged perspective view showing a state in which the first stopper is fastened to the upper damper coupling portion and the coupler.

The first nut 134b defines a female screw portion of the first stopper 134. As shown in FIGS. 9 to 11, the first bolt 134a is screwed into the first nut 134b to fasten the fixing piece portion 132 of the coupler 130 and the upper damper coupling portion 115 of the upper frame 114.

The second stopper 135 fastens the fixing piece portion 132 of the coupler 130 and the upper damper coupling portion 115 of the upper frame 114. The second stopper 135 includes the second bolt 135a and a second nut 135b.

The second bolt 135a defines a male screw portion of the second stopper 135. The second bolt 135a is inserted into the second bolt insertion hole 132b and the second bolt insertion hole 115b. The second bolt 135a has an elongated shape in the insertion direction.

The second nut 135b defines a female screw portion of the second stopper 135. In the same manner as the first stopper 134, the second bolt 135a is screwed into the second nut 135b to fasten the fixing piece portion 132 of the coupler 130 and the upper damper coupling portion 115 of the upper frame 114.

As shown in FIG. 2, the assist mechanism 120 having the above configuration is disposed to be located on an outer side (the right side) in the left-right direction of the upper frame 114 and the lower frame 111. Accordingly, the assist mechanism 120 can be disposed at a position that is unlikely to interfere with the upper frame 114, which is set in the laid-down position P1 shown in FIG. 14.

Further, the assist mechanism 120 is disposed to be located on an inner side (the left side) in the left-right direction with respect to a right end portion of the fender 108. Accordingly, the assist mechanism 120 can be prevented from coming into contact with surrounding objects.

Further, as shown in FIG. 3, the assist mechanism 120 is disposed to overlap the upper frame 114 and the lower frame 111 in a side view, in the state in which the upper frame 114 is set in the upright position P4. Accordingly, the aesthetic appearances of the protective frame 110 and the assist mechanism 120 can be improved in a side view. Further, the assist mechanism 120 is not located on a front side of the protective frame 110. Therefore, the driver who is seated on the seat 109b can be prevented from coming into contact with the assist mechanism 120, and the visibility inhibition when the driver looks backward from the seat 109b can be prevented.

Hereinafter, an attachment mode of the assist mechanism 120 having the above-described configuration with respect to the protective frame 110 will be described.

First, as shown in FIG. 4, the lower end portion of the piston rod 124 of the damper mechanism 121 and the lower damper coupling portion 112 of the lower frame 111 are coupled with each other through the lower coupling shaft 125. Further, as shown in FIG. 9, the upper end portion of the cylinder tube 122 of the damper mechanism 121 and the coupling piece portion 131 of the coupler 130 are coupled with each other through the upper coupling shaft 123.

Next, as shown in FIGS. 9 and 10, in the state in which the upper frame 114 is set in the upright position P4, the fixing piece portion 132 of the coupler 130 is located above the upper damper coupling portion 115 of the upper frame 114. In this state, the damper mechanism 121 is set in a maximum extension state (the damper mechanism 121 is set in the maximum extension state (the piston rod 124 is set in a maximum projection state with respect to the cylinder tube 122)).

Next, in the above state, the first bolt 134a is inserted into the first bolt insertion hole 132a of the coupler 130 and the first bolt insertion hole 115a of the upper damper coupling portion 115 from above. The axial line extending along the insertion direction of the first bolt 134a and the axial line extending along an extension and contraction direction of the damper mechanism 121 coincide with each other in a side view.

Next, the first nut 134b is disposed on a lower side of the upper damper coupling portion 115, and the first nut 134b is screwed onto a tip portion of the first bolt 134a. In this state, the upper damper coupling portion 115 and the fixing piece portion 132 are separated from each other in the up-down direction.

Next, as shown in FIGS. 10 and 11, the first bolt 134a is screwed into the first nut 134b. An appropriate tool is used for the above screwing. Accordingly, the upper damper coupling portion 115 and the fixing piece portion 132 are brought into close contact with each other, and the damper mechanism 121 contracts against the urging force. The first bolt 134a is screwed until the upper damper coupling portion 115 and the fixing piece portion 132 abut each other. Accordingly, the damper mechanism 121 can be held in a contracted state.

Next, as shown in FIG. 11, the second bolt 135a is inserted into the second bolt insertion hole 132b of the coupler 130 and the second bolt insertion hole 115b of the upper damper coupling portion 115 from above. Further, in the same manner as the first bolt 134a, the second bolt 135a is screwed into the second nut 135b disposed on a lower side of the upper damper coupling portion 115. Accordingly, the upper damper coupling portion 115 and the fixing piece portion 132 are fastened, and the upper frame 114 and the damper mechanism 121 are coupled with each other through the coupler 130.

With the above-described configuration, the damper mechanism 121 can be attached to the protective frame 110, in a state in which the damper mechanism 121 is contracted by a predetermined amount from the maximum extension state. Accordingly, when the damper mechanism 121 is extended and contracted in accordance with the rocking of the upper frame 114 as described above, the damper mechanism 121 can be prevented from being subjected to a force to further extend from the maximum extension state. Further, as described above, the damper mechanism 121 is configured to be contracted by screwing the first bolt 134a. Therefore, the damper mechanism 121 in a contracted state can be easily attached to the protective frame 110.

Further, in the present preferred embodiment, in the state in which the upper frame 114 is set in the upright position P4, the axial line extending along the insertion direction of the first bolt 134a and the axial line extending along the extension and contraction direction of the damper mechanism 121 coincide with each other in a side view. Accordingly, the first bolt 134a can be easily screwed against the urging force of the damper mechanism 121.

In the protective frame 110 configured as described above, as shown in FIGS. 3, 13, and 14, the upper frame 114 is capable of rocking (turning) between the upright position P4 and the laid-down position P1 with the rocking shaft 117 used as the center. In the present preferred embodiment, the position where the upper frame 114 is rotated rearward by approximately 180 degrees from the upright position P4 is defined as the laid-down position P1.

As shown in FIG. 14, an edge portion of the upper frame 114 is located below a lower end of the assist mechanism 120, in the laid-down position P1. With such a configuration, the protective frame 110 can be made compact in the front-rear direction. That is to say, the protective frame 110 can be made more compact in the front-rear direction than a case where the upper frame 114 is folded so as to locate the edge portion of the upper frame 114 above the lower end of the assist mechanism 120.

Figure 13:
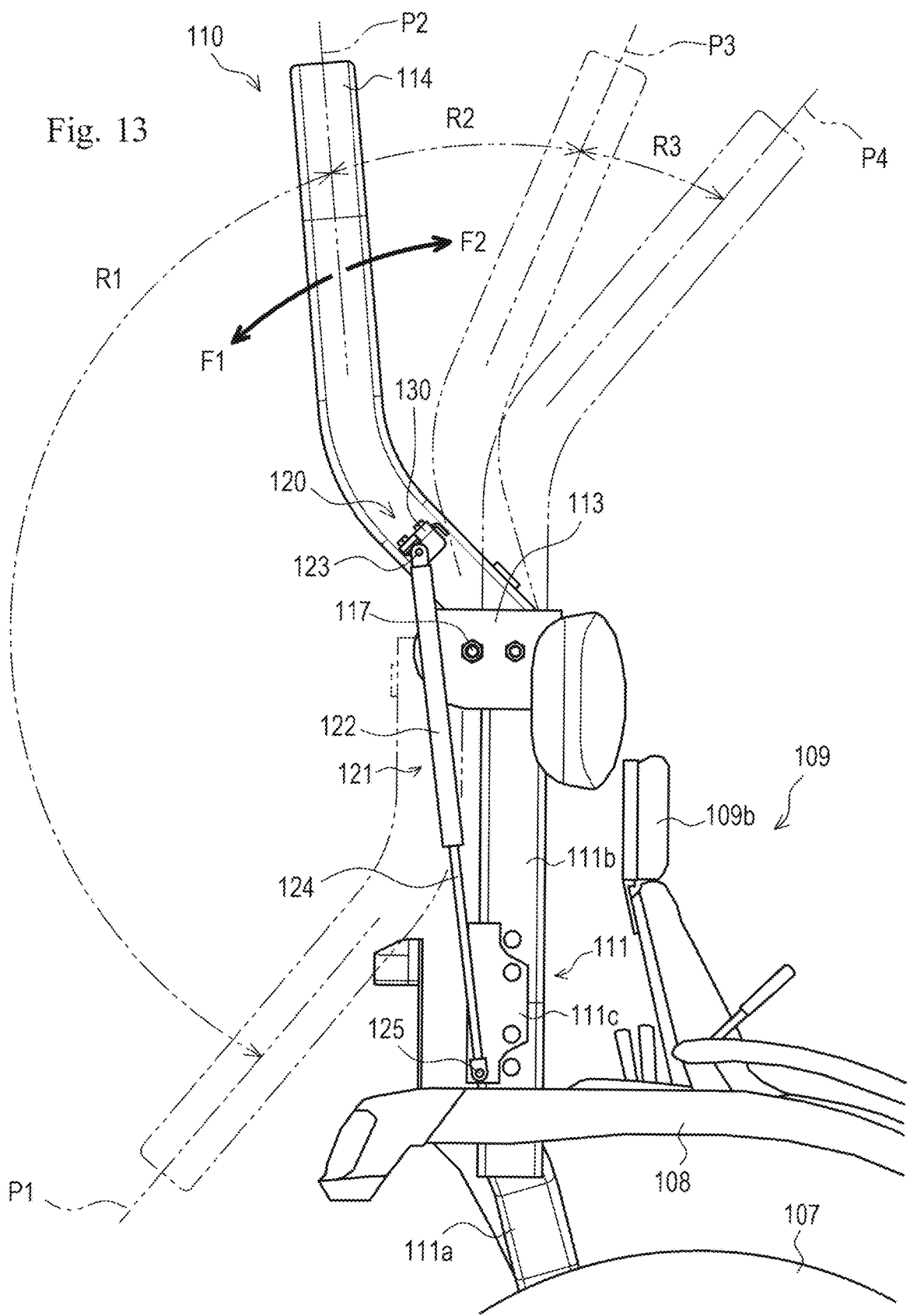
FIG. 13 is a side view showing the protective frame in which the upper frame is set in a first boundary position.

FIG. 13 shows a state in which the upper frame 114 is set in a predetermined position (hereinafter, referred to as "a first boundary position P2") between the upright position P4 and the laid-down position P1. In the present preferred embodiment, the first boundary position P2 is a position where the upper frame 114 set in the upright position P4 is rotated by approximately 45 degrees toward the laid-down position P1 side (the rear side).

Figure 12:
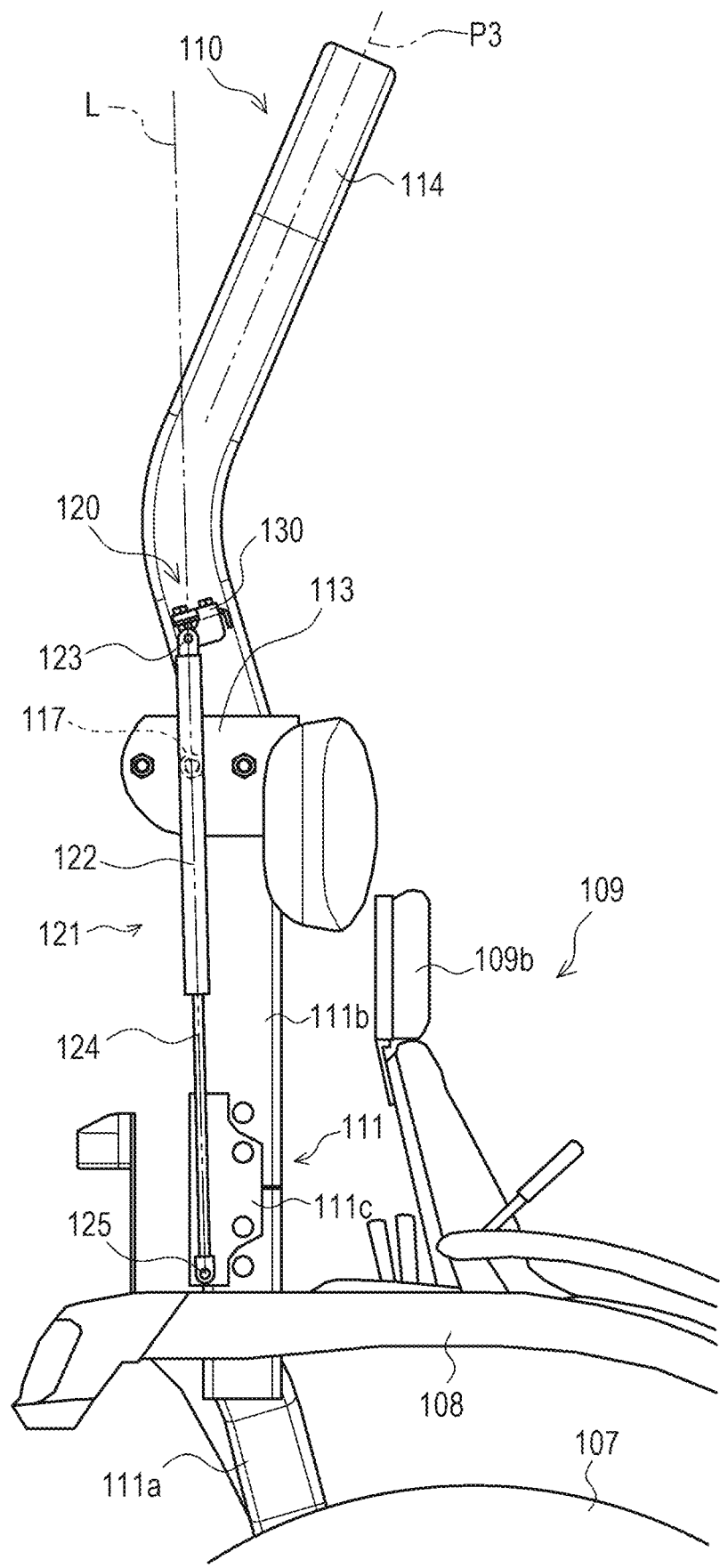
FIG. 12 is a side view showing a protective frame in which the upper frame is set in a second boundary position.

In FIG. 12, a straight line L passing through the lower coupling shaft 125 and the rocking shaft 117 of the damper mechanism 121 is shown by a two-dot chain line, in a side view. Further, FIG. 12 shows a state in which the upper coupling shaft 123 of the damper mechanism 121 is located on the straight line L. In this state, the damper mechanism 121 reaches a most extension state in the extension and contraction of the damper mechanism 121 in accordance with the rocking of the upper frame 114. The position of the upper frame 114 in this state is hereinafter referred to as "a second boundary position P3".

In the state in which the upper frame 114 is set in the upright position P4, the upper coupling shaft 123 of the damper mechanism 121 is located on the upright position P4 side with respect to the straight line L in a rocking direction of the upper frame 114. Further, in the state in which the upper frame 114 is set in the laid-down position P1, the upper coupling shaft 123 of the damper mechanism 121 is located on the laid-down position P1 side with respect to the straight line L in the rocking direction.

In the following description, a force applied to the upper frame 114 to be displaced in the rocking direction will be described with reference to FIG. 13. It is to be noted that in the following description, in a rocking range of the upper frame 114, a range from the laid-down position P1 to the first boundary position P2 is defined as a first rocking region R1. Further, in the rocking range of the upper frame 114, a range from the first boundary position P2 to the second boundary position P3 is defined as a second rocking region R2. Further, in the rocking range of the upper frame 114, a range from the second boundary position P3 to the upright position P4 is defined as a third rocking region R3.

As shown in FIG. 13, a moment of the force in the rocking direction due to its own weight (hereinafter, referred to as "a first rocking force F1") is applied to the upper frame 114. The magnitude and direction of the first rocking force F1 are determined depending on the magnitude of the weight of the upper frame 114, the position of the centroid, and the like.

In a state in which the centroid of the upper frame 114 is located on the laid-down position P1 side (the rear side) with respect to the rocking shaft 117, the first rocking force F1 is applied toward the laid-down position P1 side. Further, in a state in which the centroid of the upper frame 114 is located on the upright position P4 side (the front side) with respect to the rocking shaft 117, the first rocking force F1 is applied toward the upright position P4 side. Further, in a side view, in a state in which the centroid of the upper frame 114 is located on a vertical straight line passing through the rocking shaft 117 (a centroid boundary position), the first rocking force F1 becomes 0.

In the present preferred embodiment, the upper frame 114 is located in the centroid boundary position, in a predetermined position of the second rocking region R2. That is to say, in the present preferred embodiment, the first rocking force F1 toward the laid-down position P1 side is applied to the upper frame 114, in a state in which the upper frame 114 is located in the first rocking region R1 and in a state in which the upper frame 114 is located on the laid-down position P1 side with respect to the centroid boundary position in the second rocking region R2. Further, in the present preferred embodiment, the first rocking force F1 toward the upright position P4 side is applied to the upper frame 114, in a state in which the upper frame 114 is located on the upright position P4 side with respect to the centroid boundary position in the second rocking region R2 and in a state in which the upper frame 114 is located in the third rocking region R3.

In the rocking range of the upper frame 114, in the region on the laid-down position P1 side with respect to the centroid boundary position, the first rocking force F1 toward the laid-down position P1 side gradually decreases, as the upper frame 114 rotates to approach the centroid boundary position. Further, in the rocking range of the upper frame 114, in the region on the upright position P4 side with respect to the centroid boundary position, the first rocking force F1 toward the upright position P4 side gradually increases, as the upper frame 114 in the centroid boundary position rotates toward the upright position P4 side.

Further, as shown in FIG. 13, a moment of the force in the rocking direction by the damper mechanism 121 (hereinafter, referred to as "a second rocking force F2") is applied to the upper frame 114. The magnitude and direction of the second rocking force F2 are determined depending on the urging force of the damper mechanism 121, the positions of the upper coupling shaft 123 and the lower coupling shaft 125, and the like.

In a state in which the upper coupling shaft 123 is located on the laid-down position P1 side with respect to the straight line L in the rocking direction (a state in which the upper frame 114 is located in the first rocking region R1 and the second rocking region R2), the damper mechanism 121 urges the upper frame 114 toward the upright position P4 side. In this state, the second rocking force F2 toward the upright position P4 side is applied to the upper frame 114. Further, in a state in which the upper coupling shaft 123 is located on the upright position P4 side with respect to the straight line L in the rocking direction of the upper frame 114 (a state in which the upper frame 114 is located in the third rocking region R3), the damper mechanism 121 urges the upper frame 114 toward the laid-down position P1 side. In this state, the second rocking force F2 is applied to the upper frame 114 toward the laid-down position P1 side. Further, in a state in which the upper coupling shaft 123 is located on the straight line L, the second rocking force F2 becomes 0.

In the first rocking region R1 and the second rocking region R2, the second rocking force F2 toward the upright position P4 side gradually decreases, as the upper frame 114 rotates to approach the second boundary position P3. Further, in the third rocking region R3, the second rocking force F2 toward the laid-down position P1 side gradually increases, as the upper frame 114 in the second boundary position P3 rotates to approach the upright position P4.

The assist mechanism 120 is configured such that the first rocking force F1 toward the laid-down position P1 side is larger than the second rocking force F2 toward the upright position P4 side, in the first rocking region R1. Further, the assist mechanism 120 is configured such that the first rocking force F1 toward the laid-down position P1 side is smaller than the second rocking force F2 toward the upright position P4 side, in the second rocking region R2.

Further, the assist mechanism 120 is configured such that the first rocking force F1 toward the upright position P4 side is larger than the second rocking force F2 toward the laid-down position P1 side, in the third rocking region R3. That is to say, as described above, in the third rocking region R3, a direction of the second rocking force F2 of the damper mechanism 121 changes from the upright position P4 side to the laid-down position P1 side. However, the first rocking force F1 toward the upright position P4 side due to the weight of the upper frame 114 becomes larger than the second rocking force F2.

Hereinafter, movements in the rocking operation of the protective frame 110 and the assist mechanism 120 having the above-described configurations will be described. First, the rocking operation to rotate the upper frame 114 set in the laid-down position P1 toward the upright position P4 side will be described.

As shown in FIG. 14, the fixing pin 118 inserted into the second pin insertion holes 113c and the holes in the upper frame 114 regulates rotation of the upper frame 114 set in the laid-down position P1 toward the upright position P4 side of the upper frame 114. Therefore, first, the fixing pin 118 inserted into the second pin insertion holes 113c and the holes in the upper frame 114 is removed to make the upper frame 114 rotatable.

As shown in FIG. 13, the upper frame 114 set in the laid-down position P1 is located in the first rocking region R1. In the first rocking region R1, since the centroid of the upper frame 114 is located on the laid-down position P1 side, the first rocking force F1 is applied toward the laid-down position P1 side. As described above, in the first rocking region R1, the assist mechanism 120 is configured such that the first rocking force F1 toward the laid-down position P1 side is larger than the second rocking force F2 toward the upright position P4 side. Therefore, in displacing the upper frame 114 set in the laid-down position P1 shown in FIG. 14 toward the upright position P4 side, a manual rocking operation by the operator is needed.

Here, in the first rocking region R1, the upper coupling shaft 123 of the damper mechanism 121 is located on the laid-down position P1 side with respect to the straight line L in the rocking direction. In this state, the damper mechanism 121 urges the upper frame 114 toward the upright position P4 side. Therefore, in the first rocking region R1, the urging force of the damper mechanism 121 is capable of reducing the force needed for the rocking operation, in displacing the upper frame 114 from the laid-down position P1 to the upright position P4.

By the above rocking operation, the upper frame 114 reaches the second rocking region R2. Even in this state, the upper coupling shaft 123 of the damper mechanism 121 is located on the laid-down position P1 side with respect to the straight line L in the rocking direction. Therefore, the damper mechanism 121 urges the upper frame 114 toward the upright position P4 side.

In the present preferred embodiment, as described above, the upper frame 114 is located in the centroid boundary position, in a predetermined position in the second rocking region R2. Therefore, in the second rocking region R2, in the state in which the upper frame 114 is located on the laid-down position P1 side with respect to the centroid boundary position, the first rocking force F1 toward the laid-down position P1 side is applied to the upper frame 114. On the other hand, in the state in which the upper frame 114 is located on the upright position P4 side with respect to the centroid boundary position, the first rocking force F1 toward the upright position P4 is applied to the upper frame 114.

As described above, in the second rocking region R2, the assist mechanism 120 is configured such that the first rocking force F1 toward the laid-down position P1 side is smaller than the second rocking force F2 toward the upright position P4 side. Therefore, in the second rocking region R2, the upper frame 114 can be automatically made to stand up. That is to say, in the second rocking region R2, in the state in which the upper frame 114 is located on the laid-down position P1 side with respect to the centroid boundary position, the upper frame 114 can be automatically made to stand up by the second rocking force F2 toward the upright position P4 side against the first rocking force F1 toward the laid-down position P1 side. Further, in the state in which the upper frame 114 is located on the upright position P4 side with respect to the centroid boundary position, the upper frame 114 can be automatically made to stand up by the first rocking force F1 toward the upright position P4 side and the second rocking force F2 toward the upright position P4 side.

As described above, the upper frame 114, which has automatically stood up, reaches the third rocking region R3. Here, as described above, in the third rocking region R3, the upper frame 114 is located on the upright position P4 side with respect to the centroid boundary position. Therefore, the first rocking force F1 is configured to be applied to the upper frame 114 toward the upright position P4 side.

Here, in the third rocking region R3, the upper coupling shaft 123 of the damper mechanism 121 is located on the upright position P4 side with respect to the straight line L in the rocking direction. In this state, the damper mechanism 121 urges the upper frame 114 toward the laid-down position P1 side. Further, as described above, in the present preferred embodiment, in the third rocking region R3, the first rocking force F1 toward the upright position P4 side is larger than the second rocking force F2 toward the laid-down position P1 side. Accordingly, the upper frame 114 can be automatically made to stand up in the third rocking region R3.

In the upright position P4, further forward rotation of the upper frame 114 is restricted by the front surface of the upper frame 114 abutting the inside of the upper frame coupling portion 113. In the present preferred embodiment, the urging force of the damper mechanism 121 is capable of mitigating an impact on the upper frame coupling portion 113 of the upper frame 114.

In a state in which the upper frame 114 is set in the upright position P4, by inserting the fixing pin 118 into the first pin insertion holes 113b and the holes in the upper frame 114, the rotation of the upper frame 114 toward the laid-down position P1 side can be regulated.

Next, a rocking operation to rotate the upper frame 114 set in the upright position P4 toward the laid-down position P1 side will be described.

First, the fixing pin 118 inserted into the first pin insertion holes 113b and the holes in the upper frame 114 is removed to make the upper frame 114 rotatable.

As shown in FIG. 13, the upper frame 114 set in the upright position P4 is located in the third rocking region R3. As described above, in the third rocking region R3, the assist mechanism 120 is configured such that the first rocking force F1 toward the upright position P4 side is larger than the second rocking force F2 toward the laid-down position P1 side. Therefore, in displacing the upper frame 114 set in the upright position P4 to the laid-down position P1 side, the rocking operation by the operator is needed.

Here, in the third rocking region R3, as described above, the damper mechanism 121 urges the upper frame 114 toward the laid-down position P1 side. Therefore, the urging force of the damper mechanism 121 is capable of assisting the rocking operation in starting to tilt the upper frame 114 toward the laid-down position P1 side.

By the above rocking operation, the upper frame 114 reaches the second rocking region R2. As described above, in the second rocking region R2, the assist mechanism 120 is configured such that the first rocking force F1 toward the laid-down position P1 side is smaller than the second rocking force F2 toward the upright position P4 side. Therefore, also in the second rocking region R2, in displacing the upper frame 114 to the laid-down position P1 side, the rocking operation by the operator is needed. Here, as described above, in the state in which the upper frame 114 is located on the laid-down position P1 side with respect to the centroid boundary position, the first rocking force F1 is directed to the laid-down position P1 side. Therefore, the first rocking force F1 is capable of assisting the rocking operation toward the laid-down position P1 side.

By the above rocking operation, the upper frame 114 reaches the first rocking region R1. As described above, in the first rocking region R1, the assist mechanism 120 is configured such that the first rocking force F1 toward the laid-down position P1 side is larger than the second rocking force F2 toward the upright position P4 side. Accordingly, the upper frame 114 can be automatically laid down in the first rocking region R1. Further, the urging force of the damper mechanism 121 is capable of preventing the upper frame 114 from vigorously rocking due to its own weight.

Further, in the state in which the upper frame 114 is set in the laid-down position P1, by inserting the fixing pin 118 into the second pin insertion holes 113c and the holes in the upper frame 114, the rocking of the upper frame 114 toward the upright position P4 side can be regulated.

As described heretofore, the tractor 101 (the work vehicle) according to the present preferred embodiment includes the protective frame 110 including the lower frame 111 fixed on the rear side of the seat 109b and the upper frame 114 coupled with the upper portion of the lower frame 111 through the rocking shaft 117 so as to be capable of rocking (rotatable) in the front-rear direction.

The upper frame 114 is displaceable by a rocking operation (a rotating operation) to the upright position P4 in which the upper frame 114 stands up above the lower frame 111, and to the laid-down position P1 in which the upper frame 114 is folded with respect to the lower frame 111.

The work vehicle includes the assist mechanism 120 that assist the rocking operation (the rotating operation) of the upper frame 114.

By configuring in this manner, the rocking operation of the protective frame 110 provided on the rear side of the seat 109b can be assisted. That is to say, the provision of the assist mechanism 120 enables assisting of the rocking operation, in displacing the upper frame 114 to the laid-down position P1 or the upright position P4.

Further, the assist mechanism 120 includes the damper mechanism 121 (an urging mechanism) capable of urging the upper frame 114 toward the upright position P4 side in the rocking direction of the upper frame 114.

By configuring in this manner, the urging force of the damper mechanism 121 can be used to assist the rocking operation of the upper frame 114. That is to say, the urging force of the damper mechanism 121 can be used to reduce the force needed for the rocking operation, in displacing the upper frame 114 from the laid-down position P1 to the upright position P4. Further, in displacing the upper frame 114 from the upright position P4 to the laid-down position P1 by using the urging force of the damper mechanism 121, the upper frame 114 can be prevented from vigorously rocking due to its own weight.

Further, in the assist mechanism 120, in a state in which the upper frame 114 is located on the laid-down position P1 side (the first rocking region R1) with respect to the first boundary position P2 (the boundary position) between the upright position P4 and the laid-down position P1, the rocking force (the second rocking force F2) applied to the upper frame 114 toward the upright position P4 by the damper mechanism 121 is smaller than the rocking force (the first rocking force F1) applied to the upper frame 114 toward the laid-down position P1 due to the weight of the upper frame 114, and in a state in which the upper frame 114 is located in a predetermined range (the second rocking region R2) from the first boundary position P2 to the upright position P4 side, the rocking force (the second rocking force F2) applied to the upper frame 114 toward the upright position P4 by the damper mechanism 121 is larger than the rocking force (the first rocking force F1) applied to the upper frame 114 toward the laid-down position P1 due to the weight of the upper frame 114.

By configuring in this manner, the force needed for the rocking operation of the protective frame 110 can be further reduced. That is to say, in the state in which the upper frame 114 is located on the laid-down position P1 side (the first rocking region R1) with respect to the first boundary position P2, the upper frame 114 can be automatically made to lay down. Further, in the state in which the upper frame 114 is located in a predetermined range (the second rocking region R2) on the upright position P4 side with respect to the first boundary position P2, the upper frame 114 can be automatically made to stand up.

Further, the assist mechanism 120 includes the upper coupling shaft 123 that rotatably couples the upper frame 114 and the damper mechanism 121, and the lower coupling shaft 125 that rotatably couples the lower frame 111 and the damper mechanism 121.

The damper mechanism 121 is capable of extending and contracting, and is configured to urge to separate the upper coupling shaft 123 and the lower coupling shaft 125 from each other in an extension and contraction direction.

In the state in which the upper frame 114 is set in the upright position P4, the upper coupling shaft 123 is located on the upright position P4 side with respect to the straight line L passing through the lower coupling shaft 125 and the rocking shaft 117 in the rocking direction in a side view, and in the state in which the upper frame 114 is set in the laid-down position P1, the upper coupling shaft 123 is located on the laid-down position P1 side with respect to the straight line L in the rocking direction.

By configuring in this manner, while assisting of the rocking operation is enabled, in displacing the upper frame 114 to the upright position P4 side, the impact can be mitigated. That is to say, in the state in which the upper coupling shaft 123 is located on the laid-down position P1 side with respect to the straight line L passing through the lower coupling shaft 125 and the rocking shaft 117 in the rocking direction, the damper mechanism 121 urges the upper frame 114 toward the upright position P4 side, and is capable of assisting the rocking operation. On the other hand, in the state in which the upper coupling shaft 123 is located on the upright position P4 side with respect to the straight line L in the rocking direction, the damper mechanism 121 urges the upper frame 114 toward the laid-down position P1 side. Accordingly, the impact generated when the upper frame 114 reaches the upright position P4 can be mitigated. In addition, the rocking operation, in starting to tilt the upper frame 114 from the upright position P4 to the laid-down position P1, is assisted.

Further, the assist mechanism 120 includes the coupler 130 rotatably coupled with the damper mechanism 121 through the upper coupling shaft 123, and the first bolt 134a (a screw) that fixes the coupler 130 to the upper frame 114.

The coupler 130 is configured to enable insertion of the first bolt 134a in the extension and contraction direction of the damper mechanism 121, and holds the damper mechanism 121 in a contracted state by the first bolt 134a being screwed into the upper frame 114 side.

By configuring in this manner, the attachment performance of the damper mechanism 121 to the upper frame 114 can be improved. That is to say, regarding the damper mechanism 121, the damper mechanism 121 in the maximum extension state has to be attached by being contracted by a predetermined amount in order to prevent a force from being further applied in the extension direction. Here, it may be difficult to contract the damper mechanism 121 by manually pushing. However, by contracting the damper mechanism 121 with the use of screwing of the first bolt 134a, the damper mechanism 121 can be fixed to the upper frame 114 easily with the damper mechanism 121 contracted.

Further, the first bolt 134a is provided such that in the state in which the upper frame 114 is located in a predetermined position (the upright position P4) in the rocking direction, an axial line extending in an insertion direction of the first bolt 134a and an axial line extending in the extension and contraction direction of the damper mechanism 121 are provided to coincide with each other in a side view.

By configuring in this manner, the attachment performance of the damper mechanism 121 to the upper frame 114 can be further improved.

Further, the coupler 130 includes the cutout portion 133 that avoids at least a portion of the damper mechanism 121 in the state in which the upper frame 114 is set in the laid-down position P1.

By configuring in this manner, the interference between the damper mechanism 121 and the coupler 130 can be prevented, in the state in which the upper frame 114 is set in the laid-down position P1.

Further, the urging mechanism (the damper mechanism 121) is a damper mechanism 121 having an urging force of a spring.

By configuring in this manner, the configuration of the urging mechanism (the damper mechanism 121) can be simplified.

That is to say, the configuration can be simplified as compared with a hydraulic cylinder that needs oil supply or an electric cylinder that needs power supply to assist the rocking operation of the protective frame 110.

Further, the assist mechanism 120 is located outside the upper frame 114 and the lower frame 111 in the left-right direction.

By configuring in this manner, the assist mechanism 120 can be disposed at a suitable position.

Further, the assist mechanism 120 is located on an inner side in the left-right direction with respect to an outer end portion in the left-right direction of the fender 108, which is disposed to cover the rear wheels 107 of the tractor 101.

By configuring in this manner, the assist mechanism 120 can be prevented from coming into contact with surrounding objects.

Further, in the upper frame 114 set in the laid-down position P1, the end portion on the opposite side of the lower frame side is located below the lower end of the assist mechanism 120.

By configuring in this manner, the protective frame 110 can be made compact in the front-rear direction.

It is to be noted that the tractor 101 according to the present preferred embodiment is a preferred embodiment of a work vehicle according to the present invention.

Further, the lower frame 111 according to the present preferred embodiment is a preferred embodiment of a first frame according to the present invention.

Further, the upper frame 114 according to the present preferred embodiment is a preferred embodiment of a second frame according to the present invention.

Further, the damper mechanism 121 according to the present preferred embodiment is a preferred embodiment of an urging mechanism according to the present invention.

Further, the first bolt 134a according to the present preferred embodiment is a preferred embodiment of a screw according to the present invention.

Further, the first boundary position P2 according to the present preferred embodiment is a preferred embodiment of a boundary position according to the present invention.

Further, the second rocking region R2 according to the present preferred embodiment is a preferred embodiment of a predetermined range according to the present invention.

Heretofore, although preferred embodiments of the present invention has been described, the present invention is not limited to the above configurations, and various modifications can be made within the scope of the present invention.

For example, in the present preferred embodiment, the assist mechanism 120 is provided on the right side of the protective frame 110, but the present preferred embodiment is not limited to such a configuration. For example, the assist mechanism 120 may be provided on the left side of the protective frame 110, or the assist mechanism 120 may be provided on both the left and right sides of the protective frame 110. Further, in the present preferred embodiment, the assist mechanism 120 is provided on the outer side in the left-right direction of the lower frame 111, but the assist mechanism 120 may be provided on the inner side in the left-right direction of the lower frame 111.

Further, in the present preferred embodiment, in a predetermined position of the second rocking region R2, the centroid of the upper frame 114 is located on a straight line passing through the rocking shaft 117 in a side view (the centroid boundary position). However, the present preferred embodiment is not limited to such a configuration. That is to say, the centroid boundary position is determined according to the shape of the upper frame 114 and the like, and is not limited to the above-described example.

Further, the shapes of the upper frame 114 and the lower frame 111 are not limited to the shapes described above, and various shapes can be adopted. For example, in the present preferred embodiment, in the state in which the upper frame 114 is located in the upright position P4, the upper portion (the portion on the opposite side of the lower frame side) bends forward. However, the present preferred embodiment is not limited to such a configuration. The upper frame 114 may have a linear shape in a side view.

Further, in the present preferred embodiment, the predetermined range according to a preferred embodiment of the present invention (the range in which the second rocking force F2 toward the upright position P4 is larger than the first rocking force F1 toward the laid-down position P1) is set in the second rocking region R2. However, the present preferred embodiment is not limited to such a configuration. For example, the above-described predetermined range may be the second rocking region R2 and the third rocking region R3. That is to say, the second rocking force F2 toward the upright position P4 may be configured to be larger than the first rocking force F1 toward the laid-down position P1, in a range from the first boundary position P2 to the upright position P4 in the rocking range of the upper frame 114.

Further, in the present preferred embodiment, in the state in which the upper frame 114 is set in the upright position P4, the upper coupling shaft 123 is located on the upright position P4 side with respect to the straight line L in the rocking direction of the upper frame 114. However, the present preferred embodiment is not limited to such a configuration. For example, in the state in which the upper frame 114 is set in the upright position P4, the upper coupling shaft 123 may be located on the laid-down position P1 side with respect to the straight line L in the rocking direction of the upper frame 114.

Further, the first rocking region R1, the second rocking region R2, and the third rocking region R3 in the present preferred embodiment are examples. The present preferred embodiment is not limited to those described above. The first rocking region R1, the second rocking region R2, and the third rocking region R3 can be appropriately set in the rocking range of the upper frame 114.

Further, in the present preferred embodiment, the damper mechanism 121 is coupled with the upper frame 114 through the coupler 130. However, the present preferred embodiment is not limited to such a configuration. For example, the damper mechanism 121 may be directly coupled with the upper frame 114.

Further, in the present preferred embodiment, the damper mechanism 121 preferably includes a gas spring. However, the present preferred embodiment is not limited to such a configuration. For the damper mechanism 121, any mechanism having an urging force with various types of springs can be adopted. Further, the damper mechanism 121 is not limited to the mechanism providing an urging force by a spring, and various configurations can be adopted.

In addition, a description of a second preferred embodiment of the present invention will be described below.

A second preferred embodiment of the present invention relates to a work vehicle including a ROPS in a state of standing up from a vehicle body.

In the work vehicle having the above configuration, the ROPS is divided into a lower split body located on the vehicle body side and an upper split body located on the upper side. In addition, the upper split body is pivotally coupled to be rotatable both in a vertical acting posture with respect to the lower split body and in a folded posture of bending downward (for example, JP 2006-256509 A).

In the above-mentioned conventional configuration, in changing the posture of the ROPS, it is necessary for an operator to change the posture between the vertical acting posture and the folded posture while supporting the upper split body by hand. However, for example, the ROPS has a tough structure and a heavy weight, because it is necessary to increase the rigidity of the ROPS not to be deformed even when the vehicle body rolls over. As a result, the action of changing the posture of the ROPS needs a large workload.

Therefore, the reduction of the operator's workload in changing the posture of the ROPS is demanded.

In a characteristic configuration of a work vehicle according to a preferred embodiment of the present invention, the ROPS that stands up from the vehicle body is divided into a lower split body located on a vehicle body side, and an upper split body located on an upper side, and the upper split body is pivotally coupled to be rotatable between a vertical acting posture and a folded posture folded downward with respect to the lower split body, a gas damper is provided at the lower split body and the upper split body, the gas damper is attached to be in a free state in which neither an extension force nor a contraction force is generated when the upper split body is located in an intermediate position between the vertical acting posture and the folded posture, and a position holding mechanism capable of fixing and releasing a position of the upper split body in a rotation position corresponding to the intermediate position is provided.

According to a preferred embodiment of the present invention, in changing the posture of the ROPS, for example, in a case where the folded posture is changed to the vertical acting posture, it is necessary to rotate the upper split body upward from the folded posture. In this situation, the gas damper is shorter than that in a free state until reaching the intermediate position, and is brought into a state in which an extension force is generated. The extension force of the gas damper is capable of assisting the manual operation, so that the rotating operation can be done easily.

When the upper split body is rotated toward the vertical acting posture with an assisting operation force of the gas damper applied to the manual operation force, the upper split body may rotate vigorously, and a shock may occur. However, when the upper split body exceeds the intermediate position, the gas damper becomes shorter than that in the free state, and a contraction force is generated. As a result, the contraction force of the gas damper mitigates the momentum, so that the disadvantage such as an occurrence of a shock in the vertical acting posture can be avoided.

Then, when the gas damper is attached to or detached from the ROPS, the upper split body is fixed at the rotation position corresponding to the intermediate position. In a case where the upper split body is set in the intermediate position, the gas damper is brought into a free state. Accordingly, when the gas damper is attached or detached in this state, neither the extension force nor the contraction force is generated in the gas damper. Therefore, an excessive force may not be applied, so that the operation can be done easily.

Therefore, the operator's workload in changing the posture of the ROPS can be reduced, and in addition, the gas damper can be attached or detached easily.

In a preferred embodiment of the present invention, it is preferable that the upper split body is supported to be rotatable to a first rotation position corresponding to the vertical acting posture, a second rotation position corresponding to the intermediate position, and a third rotation position corresponding to the folded posture, and the position holding mechanism is capable of fixing and releasing the position in each of the first rotation position, the second rotation position, and the third rotation position.

According to the present configuration, the position holding mechanism is capable of fixing the position of the upper split body not only in the intermediate position but also in each of the vertical acting posture and the folded posture. The configuration for holding the position is commonly used, so that the configuration can be simplified as compared with the case where different fixing mechanisms are provided.

In a preferred embodiment of the present invention, it is preferable that the position holding mechanism includes a coupling pin that is inserted into an insertion hole in the upper split body and an insertion hole in the lower split body to be insertable and removable, a plurality of insertion holes are provided at different positions in a circumferential direction as either the insertion hole in the upper split body or the insertion hole in the lower split body, and holding the position is enabled in each of the first rotation position, the second rotation position, and the third rotation position by changing insertion of the coupling pin into any of the plurality of insertion holes.

According to the present configuration, the position can be reliably held in each rotation position by a simple configuration of changing insertion of the coupling pin into any of the plurality of insertion holes.

Figure 16:
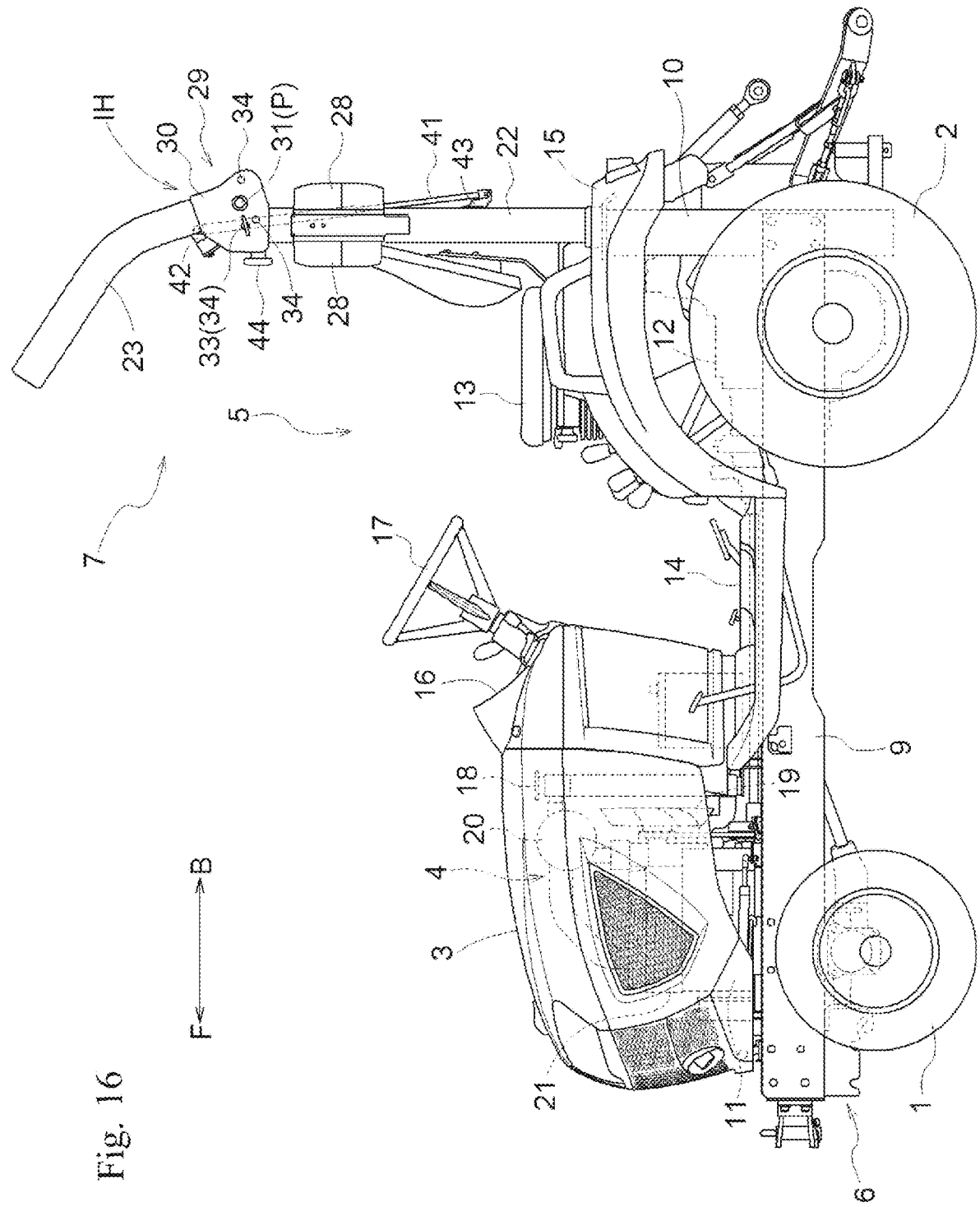
FIG. 16 is an overall side view of a tractor according to a second preferred embodiment of the present invention.
Figure 17:
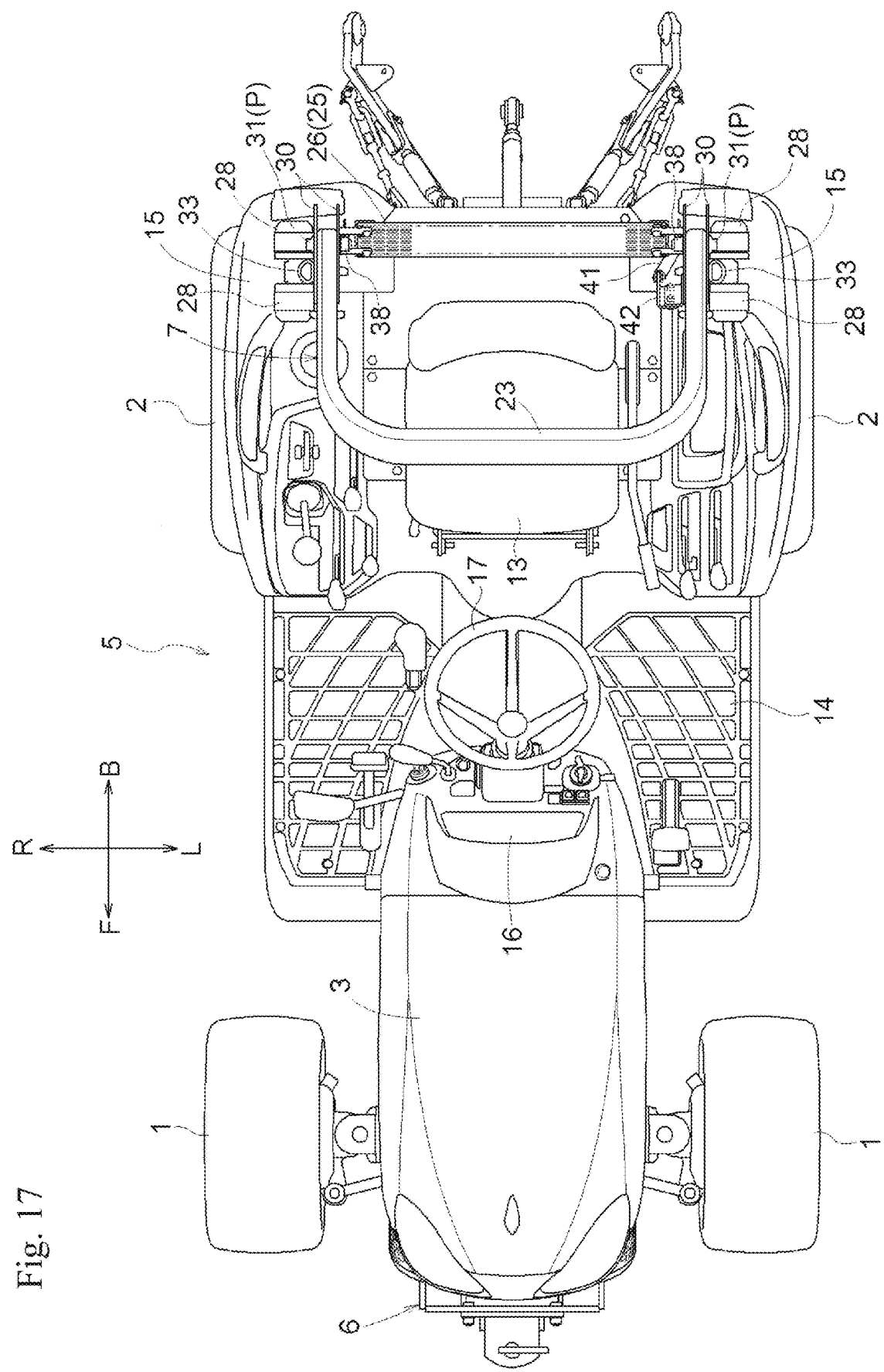
FIG. 17 is an overall plan view of the tractor.

Hereinafter, as an example of a preferred embodiment for carrying out the present invention, a preferred embodiment in which the present invention is applied to a tractor, which is an example of a work vehicle, will be described with reference to the drawings. In the present preferred embodiment, in defining the front-rear direction of the vehicle body, the front-rear direction is defined along the traveling direction of the vehicle body in a working state, and in defining the left-right direction of the vehicle body, the left and right are defined in a traveling direction view of the vehicle body. That is to say, the direction indicated by the reference numeral (F) in FIGS. 16 and 17 is the front side of the vehicle body, and the direction indicated by the reference numeral (B) in FIG. 16 is the rear side of the vehicle body. In addition, the direction indicated by the reference numeral (R) in FIG. 17 is the right side of the vehicle body, and the direction indicated by the reference numeral (L) in FIG. 17 is the left side of the vehicle body.

As shown in FIGS. 16 and 17, the tractor illustrated in the present preferred embodiment includes a pair of left and right front wheels 1 that enable a steering operation, a pair of left and right rear wheels 2 that are fixed in orientation, a motor unit 4 located in the inside of a bonnet 3 in a front portion of the vehicle body, a driving unit 5 located on an upper side in a rear portion of the vehicle body, and a ROPS 7 located in a rear portion of the driving unit 5 and extending upward from a vehicle body frame 6. The vehicle body frame 6 is made of a steel plate, and includes left and right main frames 9 that are long in the front-rear direction, and a rear side support frame 10 that couples rear portions of the left and right main frames 9.

At a lower portion of the rear portion of the vehicle body, a transmission 12 that shifts the power of an engine 11 provided in the motor unit 4 so as to transmit the power to the left and right rear wheels 2 and the like, while being supported by the rear portion of the left and right main frames 9 and the rear side support frame 10.

In the driving unit 5, a driver's seat 13 is disposed while being located above the transmission 12. A driving unit step 14 on which the driver is able to step on is provided within an interval width in the front-rear direction between the driver's seat 13 and the motor unit 4. Rear wheel fenders 15 are provided on both the left and right sides of the driver's seat 13. An operation panel unit 16 is provided at a portion on the rear side of the bonnet 3 of the motor unit 4. The operation panel unit 16 includes a steering wheel 17 to steer the front wheels, a plurality of operating tools, and instruments. In addition to the engine 11, the motor unit 4 includes a radiator 18 to cool the engine, a cooling fan 19, an air cleaner 20, a muffler 21, and the like.

The ROPS 7 is configured as follows.

Figure 18:
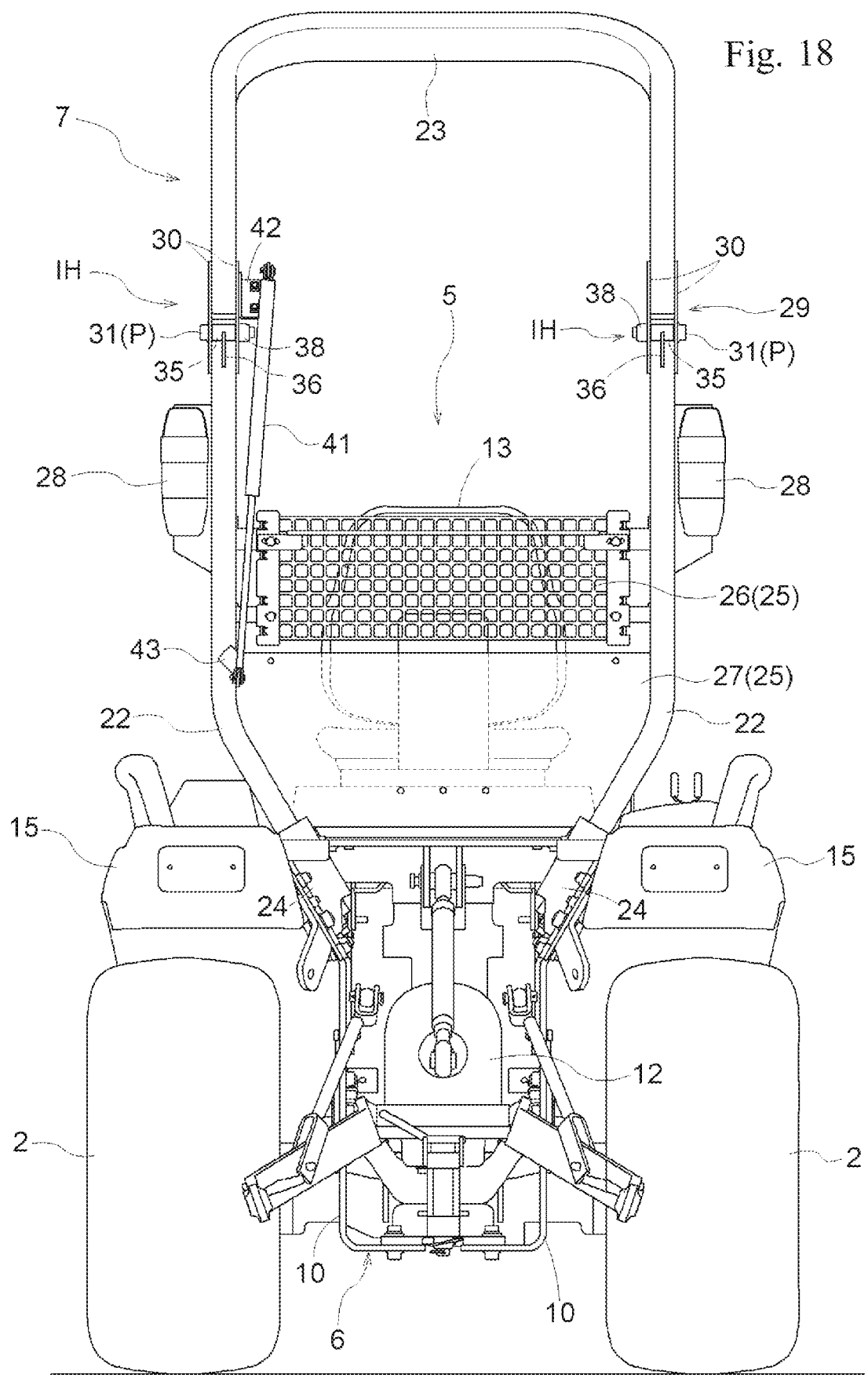
FIG. 18 is a rear view of the tractor.
Figure 19:
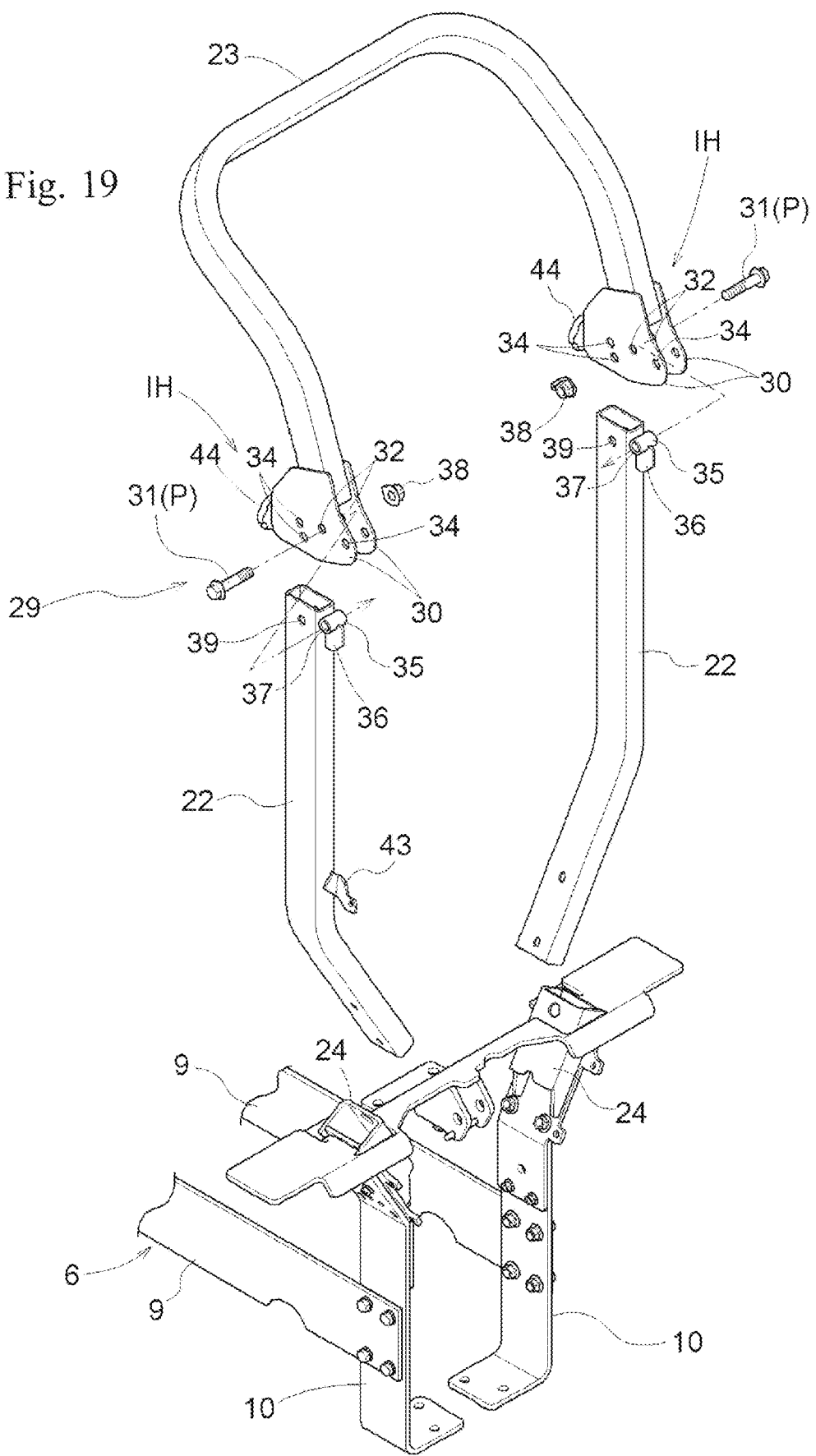
FIG. 19 is an exploded perspective view of a ROPS.

As shown in FIGS. 18 and 19, the ROPS 7 is divided into left and right support columns 22 defining and functioning as a lower split body located on the vehicle body side and an arch 23 defining and functioning as an upper split body located on the upper side. The left and right support columns 22 are respectively located on the left and right sides on the rear side of the driver's seat 13. The arch 23 extends in a substantially arch shape in a front-rear direction view, and lower ends on both the left and right sides are respectively coupled with the upper portions of the left and right support columns 22. The arch 23 has a shape that bends to be located on the front side of the vehicle body toward the upper side in a side view, in the vertical acting posture. The lower portions of the left and right support columns 22 are respectively inserted into left and right support portions 24, each having a pipe shape, provided on the rear side support frame 10, and are fixed by coupling with bolts to be firmly supported.

As shown in FIG. 18, a back cover 25 is attached while being hung across the lower portions of the left and right support columns 22. The back cover 25 includes a resin net 26 located at an upper portion, and a sheet metal plate 27 located at a lower portion. The provision of such a back cover 25 enables prevention of noise to the driver seated on the driver's seat 13, while avoiding obstruction of a rear view. Further, in the drawings, a reference numeral 28 is an indicator lamp that functions as a direction indicator or a hazard lamp.

The left and right support columns 22 and the arch 23 are each made of a square steel pipe having a rectangular shape in cross section. The arch 23 is rotatably supported between the vertical acting posture extending from the upper sides of the left and right support columns 22 and the folded posture that is folded rearward and downward, and the position of the arch 23 can be held in the vertical acting posture and the folded posture.

For an additional description, as shown in FIG. 18, coupling units 29 are continuously provided while rotating integrally with the lower end portions of the arch 23. The coupling units 29 each includes a pair of left and right plates 30, which are integrally fixed to left and right side surfaces at the lower end portions of the arch 23. As shown in FIG. 19, the pair of left and right plates 30 are located to overlap the upper portions of the support columns 22 on both the left and right sides. Insertion holes 32, through which a bolt 31 is inserted to define a rotation fulcrum, are respectively provided in the left and right plates 30. Further, three positioning insertion holes 34 to allow insertion of a coupling pin 33 are provided in each of the left and right plates 30. The positioning insertion holes 34 have distances from the rotation fulcrum P provided with the bolt 31 to be identical to one another, and are located at positions different from one another in a circumferential direction.

As shown in FIG. 19, a boss 35 having a tubular shape is fixedly attached to the upper portion of the support column 22. A reinforcing rib 36 is integrally coupled between a lower side of the boss 35 and a side surface of the support column 22 to enhance the supporting strength of the boss 35. The bolt 31 is inserted through the insertion hole 32 to define the rotation fulcrum in each of the left and right plates 30 and an insertion bore 37 inside the boss 35, and a tip portion of the bolt 31 is fastened and fixed with a nut 38. The rotation fulcrum P is defined with the bolt 31.

Figure 20:
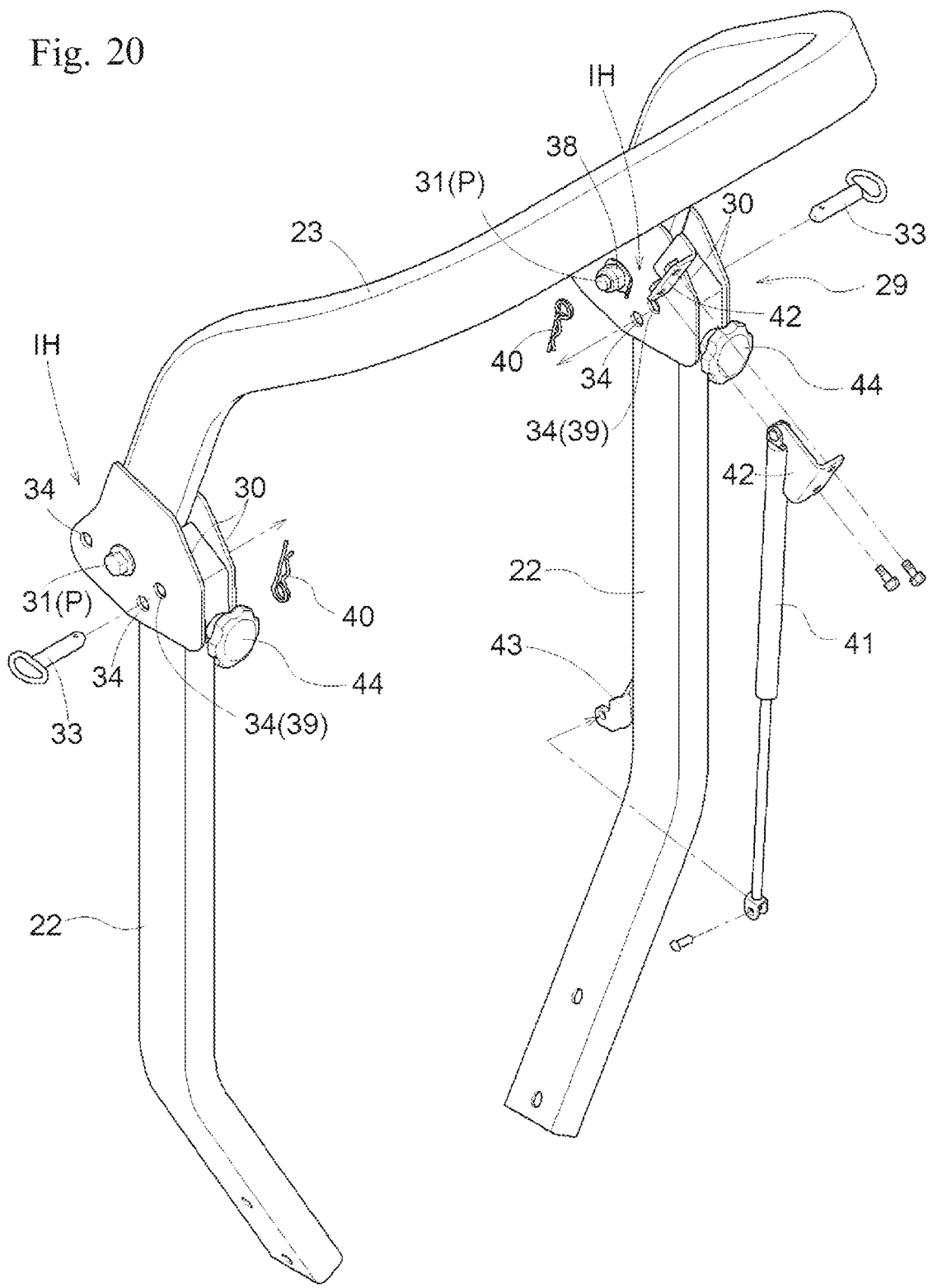
FIG. 20 is an exploded perspective view of a position holding mechanism.

One insertion hole 39 to perform positioning penetrates through the support column 22 in a lateral direction, in the upper portion of the support column 22. As shown in FIG. 20, by inserting the coupling pin 33 into the insertion hole 39 of the support column 22 and any one of the three insertion holes 34 in each of the left and right plates 30, the arch 23 can be fixed and held in position.

By changing the insertion of the coupling pin 33 into any one of the three insertion holes 34, the arch 23 is supported so that the position can be fixed in a first rotation position C1

(see FIG. 21) corresponding to the vertical acting posture, a second rotation position C2 (see FIG. 22) corresponding to the intermediate position, and a third rotation position C3 (see FIG. 23) corresponding to the folded posture. That is to say, the three insertion holes 34 are located at positions corresponding to the respective rotation positions.

The arch 23 is rotatably supported by the left and right plates 30 integrally provided at the lower end portions of the arch 23, the boss 35, the bolt 31 to define a support fulcrum, the insertion holes 34 in the coupling unit 29, the insertion holes 39 in the support column 22, the coupling pin 33 inserted into the above holes to be insertable and removable, and the like. A position holding mechanism IH is configured to support the position of the arch 23 to be capable of fixing and releasing the position, in each of the first rotation position C1, the second rotation position C2, and the third rotation position C3. A retaining pin 40 prevents the coupling pin 33 from coming off, while the coupling pin 33 is inserted.

Figure 21:
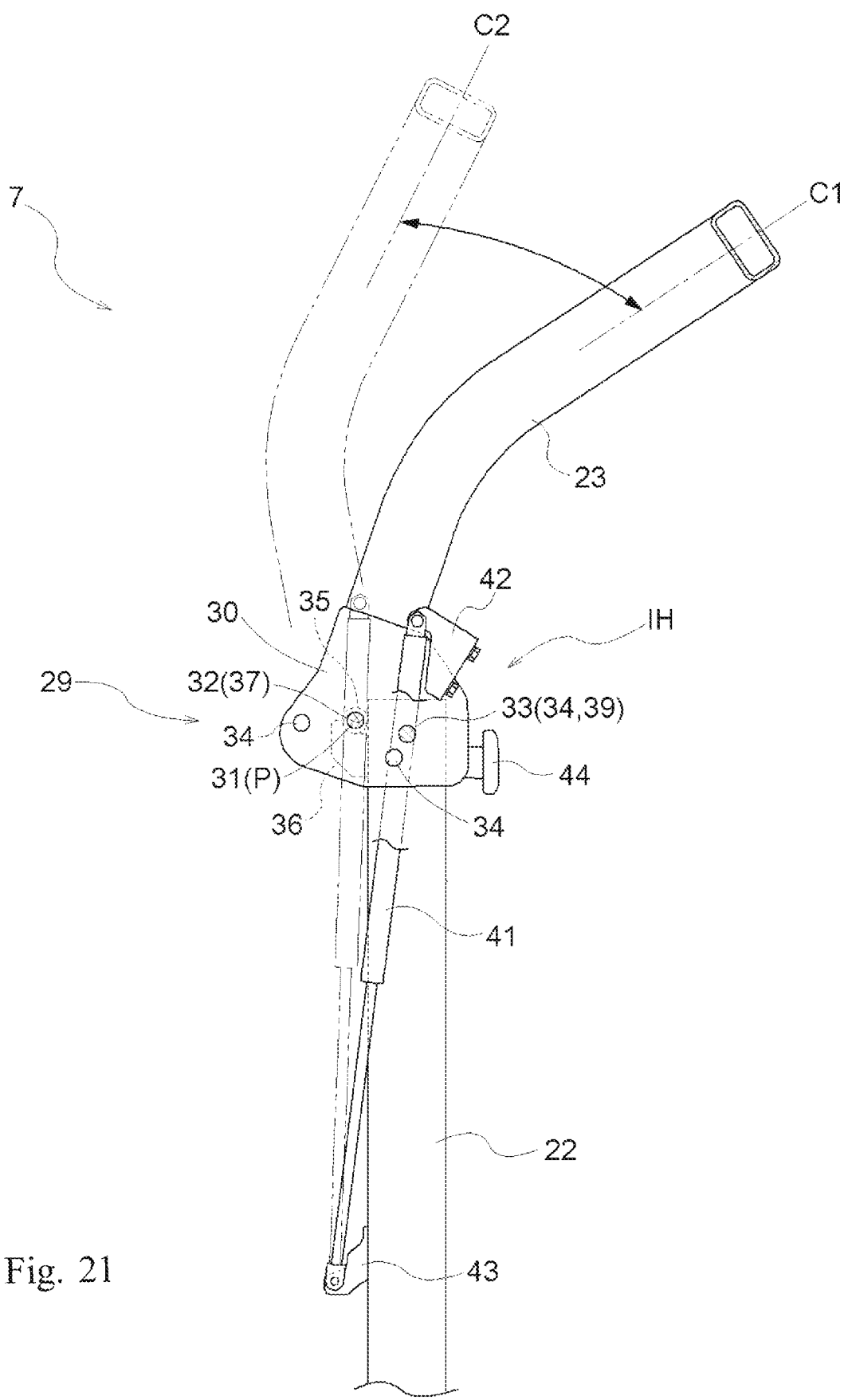
FIG. 21 is a side view of the ROPS in a first rotation position.
Figure 22:
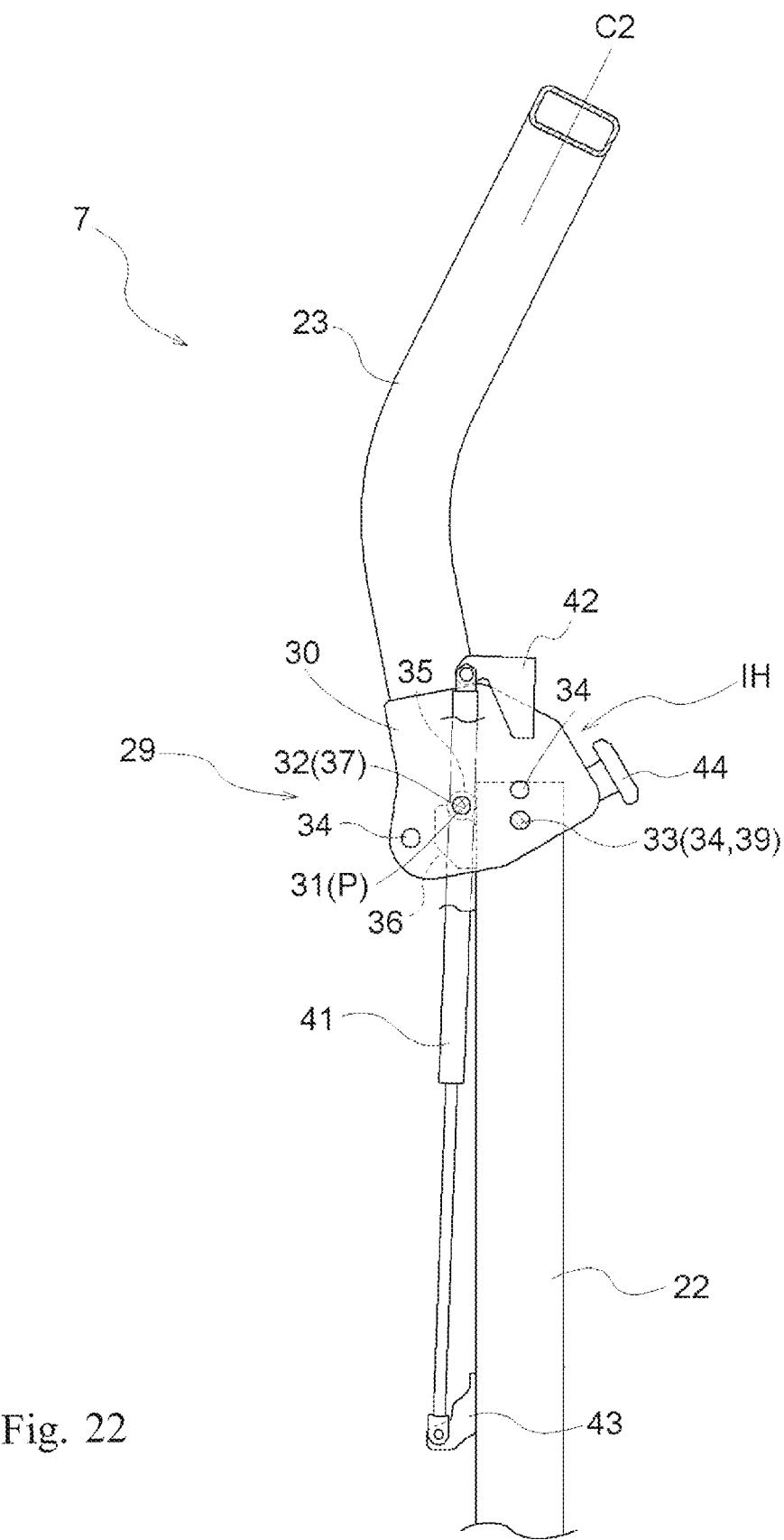
FIG. 22 is a side view of the ROPS in a second rotation position.

As shown in FIGS. 18 and 20 to 23, a gas damper 41 is provided at the left coupling unit 29 of the arch 23 and the left support column 22. As shown in FIG. 22, the gas damper 41 is attached to be in a free state in which neither the extension force nor the contraction force is generated, in a state in which the arch 23 is set in the second rotation position C2.

For an additional description, as shown in FIGS. 20 and 21, an upper end portion of the gas damper 41 is pivotally coupled through a support bracket 42 with a position on an inner side in the left-right direction of the coupling unit 29 on the left side and on a front side with respect to the position of the rotation fulcrum P in the state in which the arch 23 is set in the first rotation position C1. Further, a lower end portion of the gas damper 41 is pivotally coupled through a support bracket 43 with a position on an inner side in the left-right direction and slightly on a rear side with respect to a rear surface of the support column 22, at an intermediate position in the up-down direction of the support column 22 on the left side.

Figure 23:
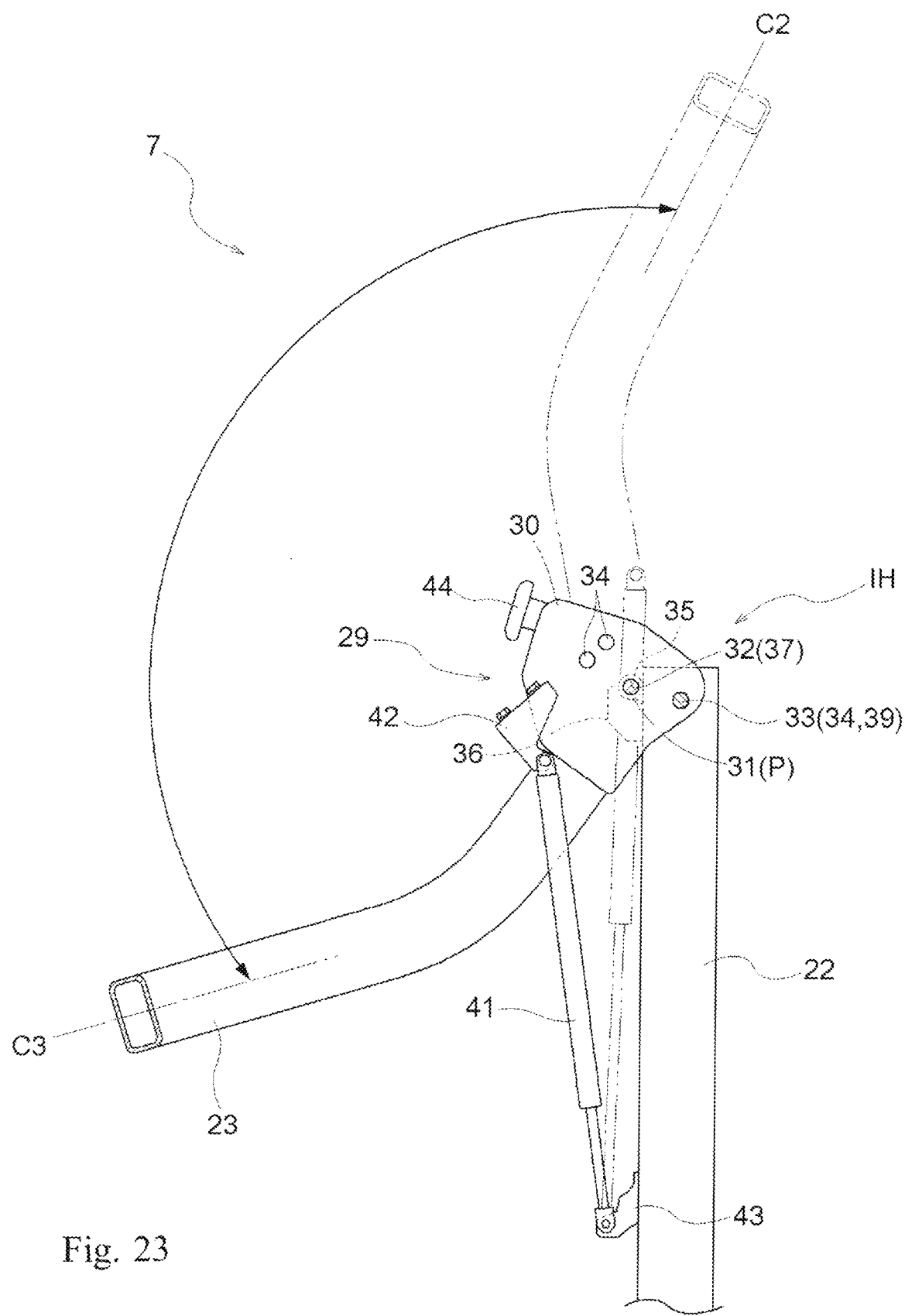
FIG. 23 is a side view of the ROPS in a third rotation position.

As shown in FIG. 22, the gas damper 41 overlaps the position of the rotation fulcrum P in a side view in the state in which the arch 23 is set in the second rotation position C2 (the intermediate position), and is in a longest extension state, that is, in a free state in which neither the extension force nor the contraction force is generated. As shown in FIG. 21, in the state in which the arch 23 is set in the first rotation position C1 (the vertical acting posture), the upper end portion of the gas damper is located on the front side with respect to the rotation fulcrum P, and the gas damper 41 is brought into a contraction state from the longest extension state. As shown in FIG. 23, in the state in which the arch 23 is set in the third rotation position C3 (the folded posture), the upper end portion of the gas damper is located on the front side with respect to the rotation fulcrum P, and the gas damper 41 is brought into the contraction state from the longest extension state.

As shown in FIG. 20, bolts 44 with knobs are respectively provided on the front surface side of the coupling units 29 on both of the left and right sides. Although not described in detail, the bolt 44 is configured to firmly fix the arch 23 in position by fastening the arch 23 in the state of the vertical acting posture.

In such a configuration, in changing the posture of the arch 23 from the state in which the arch 23 is set in the first rotation position C1 (the vertical acting posture) to the third rotation position C3 (the folded posture), first, the retaining pin 40 is removed to pull out the coupling pin 33. Then, the arch 23 is manually rotated around the rotation fulcrum P to the rear side. In this situation, until the arch 23 reaches the second rotation position C2 from the first rotation position C1, the gas damper 41 is brought into the contraction state, and an extension force to extend toward the free state acts. As a result, the extension force of the gas damper 41 acts as an assisting force to manually rotate the arch 23. Therefore, the workload can be reduced.

In a case where the arch 23 exceeds the second rotation position C2, the weight of the arch 23 exerts a force to rotate the arch 23 toward the third rotation position C3 side, and the arch 23 is about to rotate vigorously. However, when the arch 23 exceeds the second rotation position C2, the gas damper 41 is brought into the contraction state again and an extension force acts on the arch 23. Therefore, the function of controlling the movement of the arch 23, which is about to rotate vigorously, is exerted. As a result, the occurrence of a shock in the third rotation position C3 can be avoided.

In the same manner, also in changing the arch 23 from the third rotation position C3 (the folded posture) to the first rotation position C1 (the vertical acting posture), the extension force of the gas damper 41 acts as an assisting force to manually rotate the arch 23 from the third rotation position C3 (the folded posture) to the second rotation position C2. Therefore, the workload can be reduced. When the arch 23 exceeds the second rotation position C2, the gas damper 41 is brought into the contraction state again, and an extension force acts. Therefore, the function of controlling the movement of the arch 23 is exerted.

In attaching the gas damper 41 to the ROPS 7 or removing the gas damper 41 from the ROPS 7, such a work is performed in the state in which the arch 23 is fixed in the second rotation position C2 (the intermediate position). With such a configuration, the gas damper 41 is in a free state at the time of attachment or detachment, and the need for manually extending or contracting the gas damper 41 is eliminated. Therefore, the work can be performed easily.

It is to be noted that the ROPS 7 according to the present preferred embodiment is a preferred embodiment of a protective frame according to the present invention.

Further, the support column 22 (the lower split body) according to the present preferred embodiment is a preferred embodiment of a first frame according to the present invention.

Further, the arch 23 (the upper split body) according to the present preferred embodiment is a preferred embodiment of a second frame according to the present invention.

Further, the gas damper 41 according to the present preferred embodiment is a preferred embodiment of an assist mechanism according to the present invention.

Another Preferred Embodiment

In a preferred embodiment described above, the description has been given as an example with regard to the arch 23 (the upper split body) having a shape of bending to be located on the front side of the vehicle body toward the upper side of the arch 23 in a side view, in the vertical acting posture. However, instead of such a shape, a linearly extending shape may be applicable.

In a preferred embodiment described above, the description has been given as an example with regard to the plurality of insertion holes 34 on the arch 23 (the upper split body) side that are located at different positions in the circumferential direction. However, a plurality of insertion holes 39 on the support column 22 (the lower split body) side may be located at different positions in the circumferential direction.

In a preferred embodiment described above, the description has been given with regard to the position holding mechanism IH configured to be capable of fixing and releasing the position of the arch 23 (the upper split body) in each of the first rotation position C1, the second rotation position C2, and the third rotation position C3. However, instead of such a configuration, the position holding mechanism IH is configured to be capable of fixing and releasing the position of the arch 23 (the upper split body) only in the second rotation position C2, and a fixing mechanism capable of fixing the position of the arch 23 in each of the first rotation position C1 and the third rotation position C3 may be provided separately from the position holding mechanism.

Preferred embodiments of the present invention are applicable to work vehicles such as tractors, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle comprising:
a protective frame including a first frame and a second frame rotatably coupled with an upper portion of the first frame; and
an assist mechanism to assist a rotating operation of the second frame; wherein
the first frame is a lower frame that is fixed on a rear side of a seat;
the second frame is an upper frame coupled with the upper portion of the lower frame through a rocking shaft to be capable of rocking in a front-rear direction;
the upper frame is displaceable by a rocking operation to an upright position in which the upper frame stands up above the lower frame, and to a laid-down position in which the upper frame is folded with respect to the lower frame;
the assist mechanism includes an urging mechanism capable of urging the upper frame toward a side of the upright position in a rocking direction of the upper frame; and
the assist mechanism is configured such that, in a state in which the upper frame is located on a side of the laid-down position with respect to a boundary position between the upright position and the laid-down position, a rocking force applied to the upper frame toward the upright position by the urging mechanism is smaller than the rocking force applied to the upper frame toward the laid-down position due to a weight of the upper frame, and in a state in which the upper frame is located in a predetermined range from the boundary position on the side of the upright position, the rocking force applied to the upper frame toward the upright position by the urging mechanism is larger than the rocking force applied to the upper frame toward the laid-down position due to the weight of the upper frame.

2. The work vehicle according to claim 1, wherein
the assist mechanism includes an upper coupling shaft that rotatably couples the upper frame and the urging mechanism; and
a lower coupling shaft that rotatably couples the lower frame and the urging mechanism;
the urging mechanism is capable of extending and contracting, and is configured to urge to separate the upper coupling shaft and the lower coupling shaft from each other in an extension and contraction direction;
in a state in which the upper frame is set in the upright position, the upper coupling shaft is located on the side of the upright position in the rocking direction with respect to a straight line passing through the lower coupling shaft and the rocking shaft in a side view; and
in a state in which the upper frame is set in the laid-down position, the upper coupling shaft is located on the side of the laid-down position in the rocking direction with respect to the straight line.

3. The work vehicle according to claim 2, wherein
the assist mechanism includes a coupler rotatably coupled with the urging mechanism through the upper coupling shaft, and a screw that fixes the coupler to the upper frame; and
the coupler is configured to enable the screw to be inserted through in the extension and contraction direction of the urging mechanism, and holds the urging mechanism in a contracted state with the screw screwed into the upper frame.

4. The work vehicle according to claim 3, wherein the screw is provided such that in a state in which the upper frame is located in a predetermined position in the rocking direction, an axial line extending in an insertion direction of the screw and an axial line extending in the extension and contraction direction of the urging mechanism coincide with each other in the side view.

5. The work vehicle according to claim 3, wherein the coupler includes a cutout portion that avoids at least a portion of the urging mechanism in a state in which the upper frame is set in the laid-down position.

6. The work vehicle according to claim 1, wherein the urging mechanism is a damper mechanism providing an urging force by a screw.

7. The work vehicle according to claim 1, wherein the assist mechanism is located on an outer side in a left-right direction of the upper frame and the lower frame.

8. The work vehicle according to claim 1, wherein the assist mechanism is located on an inner side in a left-right direction with respect to an outer end portion in the left-right direction of a fender that is disposed to cover a rear wheel of the work vehicle.

9. The work vehicle according to claim 1, wherein in a state in which the upper frame is set in the laid-down position, an end portion on an opposite side of a lower frame side is located below a lower end of the assist mechanism.

10. The work vehicle according to claim 1, wherein
the protective frame is divided into a lower split body defining and functioning as the first frame located on a vehicle body side, and an upper split body defining and functioning as the second frame located on an upper side, and the upper split body defines a Roll Over Protection Structure (ROPS) that is pivotally coupled to be rotatable between a vertical acting posture and a folded posture folded downward with respect to the lower split body and that stands up from a vehicle body;
the assist mechanism includes a gas damper provided at the lower split body and the upper split body;
the gas damper is attached to be in a free state in which neither an extension force nor a contraction force is generated when the upper split body is located in an intermediate position between the vertical acting posture and the folded posture; and a position holding mechanism capable of fixing and releasing a position of the upper split body in a rotation position corresponding to the intermediate position is provided.

11. The work vehicle according to claim 10, wherein the upper split body is supported to be rotatable to a first rotation position corresponding to the vertical acting posture, a second rotation position corresponding to the intermediate position, and a third rotation position corresponding to the folded posture; and the position holding mechanism is capable of fixing and releasing the position in each of the first rotation position, the second rotation position, and the third rotation position.

12. The work vehicle according to claim 11, wherein the position holding mechanism includes a coupling pin that is inserted into an insertion hole in the upper split body and an insertion hole in the lower split body to be insertable and removable, a plurality of insertion holes are located at different positions in a circumferential direction as either the insertion hole in the upper split body or the insertion hole in the lower split body, and holding the position is enabled in each of the first rotation position, the second rotation position, and the third rotation position by changing insertion of the coupling pin into any of the plurality of insertion holes.

* * * * *